(12) United States Patent
Ford

(10) Patent No.: US 11,868,450 B2
(45) Date of Patent: *Jan. 9, 2024

(54) NETWORK AND DEVICE SECURITY SYSTEM, METHOD, AND APPARATUS

(71) Applicant: SunStone Information Defense, Inc., Los Gatos, CA (US)

(72) Inventor: David K. Ford, Carmel, CA (US)

(73) Assignee: SUNSTONE INFORMATION DEFENSE, INC., Jamestown, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 17/856,422

(22) Filed: Jul. 1, 2022

(65) Prior Publication Data

US 2022/0405355 A1 Dec. 22, 2022

Related U.S. Application Data

(63) Continuation of application No. 16/662,692, filed on Oct. 24, 2019, now Pat. No. 11,379,564.

(Continued)

(51) Int. Cl.
*G06F 21/16* (2013.01)
*G06F 21/44* (2013.01)
(Continued)

(52) U.S. Cl.
CPC .............. *G06F 21/16* (2013.01); *G06F 21/34* (2013.01); *G06F 21/44* (2013.01); *G06F 21/46* (2013.01); *G06F 21/554* (2013.01); *G06F 21/62* (2013.01)

(58) Field of Classification Search
CPC ........ G06F 21/16; G06F 21/44; G06F 21/554; G06F 21/34; G06F 21/62; G06F 21/46
See application file for complete search history.

(56) References Cited

U.S. PATENT DOCUMENTS 7,664,960 B1   2/2010  Clubb
7,701,364 B1*  4/2010  Zilberman ............ G06F 21/316
                                                   702/194

(Continued)

OTHER PUBLICATIONS

International Search Report and Written Opinion dated Feb. 25, 2020 issued for International PCT Application No. PCT/US19/57859.

(Continued)

*Primary Examiner* — Thaddeus J Plecha
(74) *Attorney, Agent, or Firm* — K&L Gates LLP

(57) ABSTRACT

A system, apparatuses, and methods for device and network security are discussed herein. In an example, a security device for providing security to user-entered inputs includes a universal serial bus ("USB") port configured to receive a connector of an input device and a USB connector configured to connect to a port of a user device. The apparatus also includes a processor configured to receive a string of characters from the input device that correspond to inputs made by a user into a web browser or application on the user device. The processor adds at least one security character to the string of characters to generate a watermark string, and transmits the watermark string to the user device. The processor is configured to format the at least one security character such that only the string of characters are displayed in the web browser or the application at the user device.

20 Claims, 22 Drawing Sheets

Related U.S. Application Data

(60) Provisional application No. 62/749,857, filed on Oct. 24, 2018, provisional application No. 62/749,867, filed on Oct. 24, 2018, provisional application No. 62/749,859, filed on Oct. 24, 2018.

(51) Int. Cl.
*G06F 21/55* (2013.01)
*G06F 21/34* (2013.01)
*G06F 21/62* (2013.01)
*G06F 21/46* (2013.01)

(56) References Cited

U.S. PATENT DOCUMENTS

| | | | |
|---|---|---|---|
| 9,477,836 B1* | 10/2016 | Ramam | H04W 12/02 |
| 11,379,564 B2* | 7/2022 | Ford | G06F 21/554 |
| 2007/0182714 A1 | 8/2007 | Pemmaraju | |
| 2009/0254994 A1 | 10/2009 | Waterson | |
| 2009/0028203 A1 | 11/2009 | Diamond | |
| 2013/0263240 A1 | 10/2013 | Moskovitch | |
| 2015/0121467 A1* | 4/2015 | Yun | H04L 63/10 |
| | | | 726/4 |
| 2018/0026947 A1* | 1/2018 | Haworth | H04L 63/0442 |
| | | | 713/168 |
| 2020/0104538 A1 | 4/2020 | Summers | |

OTHER PUBLICATIONS

International Preliminary Report on Patentability dated Apr. 27, 2021 issued for International PCT Application No. PCT/US19/57859.

* cited by examiner

NETWORK AND DEVICE SECURITY SYSTEM, METHOD, AND APPARATUS

PRIORITY CLAIM

The present application a continuation application of U.S. patent application Ser. No. 16/662,692, filed on Oct. 24, 2019, now U.S. Pat. No. 11,379,564, which claims priority to and the benefit of U.S. Provisional Application No. 62/749,857, filed on Oct. 24, 2018; U.S. Provisional Application No. 62/749,859, filed on Oct. 24, 2018; and U.S. Provisional Application No. 62/749,867, filed on Oct. 24, 2018. The entirety of each application is herein incorporated by reference.

BACKGROUND

As of 2019, it is estimated that billions of personal computers, laptops, tablet computers, and smartphones have been infected by at least one malicious application (i.e., malware). Generally, malware is capable of infecting the userspace, kernel space, and/or hardware of a computing device and can take the form of a virus/worm, Trojan/ rootkit, spyware, or key logger. Most malicious applications are designed to infect a user's computing device for obtaining access to the user's personal information that is stored or hosted by a third-party. For example, many malicious applications are designed to obtain a user's username and password for web-based email systems, cloud-based document management systems, online banking systems, investment management systems, and social media systems.

Users are typically unaware that a malicious application is present on their devices, let alone stealing their username/ password. As such, malicious applications may not be noticed until a developer of the malicious applications leverages the stolen username/password to change the user's personal information, drain a bank account, etc. By that time, the attack is over and identifying the malicious application is moot.

Known anti-malware programs attempt to identify and remove/isolate malicious applications. For instance, many anti-malware programs are configured to search for certain file names or processing signatures that are indicative of a malicious application. These anti-malware programs are outstanding at identifying known malicious application but less than adequate at detecting new or modified malicious applications. As one can imagine, it is a cat-and-mouse game between developers of malicious applications and anti-malware programs, with users left in between.

In addition to malicious applications located on user devices, some malicious applications are configured to intercept data communications over a network between user devices and third-party servers. The malicious applications may be present on a local network and/or on a wide area network (e.g., the Internet). In many instances, the malicious applications are designed to search for usernames, passwords, and other sensitive information in unencrypted (or less robustly encrypted) communications. In other instances, the malicious applications are designed to obtain public and/or private keys to enable encrypted communications to be decrypted, thereby exposing the user and third-party server to man-in-the-middle attacks.

SUMMARY

The example system, method, and apparatus disclosed herein are configured to prevent malicious applications from reading or otherwise interacting with communications between a user device and a remote server. In one embodiment, the example system, method, and apparatus disclosed herein are configured as a security device that is placed between an input device (e.g., a keyboard) and a user device (e.g., a computer). The security device adds or otherwise combines text entered by a user via the user device with identifier text, randomly generated characters, or other security inputs/characters. In some embodiments, the security device is provided separate from a chipset of a user device. The separation of the security device significantly reduces an attack surface for a malicious application located on the user device or a malicious application communicating with the user device. The text or characters provided by the security device are configured to be deleted or otherwise hidden from view of the user while transmitted by an event logger to a security server. For instance, the security inputs/ characters may include delete or backspace keystrokes that cause the user device to delete the reminder of the security inputs/characters before they are displayed to the user.

The security server is configured to use the security inputs/characters for validating communications with the user device. Since the security device is located in the text-input path, the security inputs/characters are entered prior to reaching any malicious application residing on a processor (or at the network-level) on the user device. The malicious application would receive the input after processing when the security inputs/characters are removed. As such, the malicious application would be unaware of the security inputs/characters. Alternatively, key logging malicious applications would receive a string of user-generated characters combined with security inputs/characters. However, without knowing how the security inputs/characters were generated and applied, the malicious application would not be able to isolate the user entered characters. The example system, method, and apparatus disclosed herein accordingly provide authentication of user-entered text that cannot be deciphered or manipulated by a malicious application without causing detection.

In some embodiments, the system, method, and apparatus disclosed herein may additionally or alternatively include a mobile endpoint device that communicates via a short-distance wireless protocol with a user device, such as a smartphone. The mobile endpoint device is configured to receive user inputs and encrypt corresponding data for transmission to an application server. A proxy server located between the user device and the application server may be provided to decrypt the data prior to the data being transmitted to the application server. Such a configuration enables data from a secure device to be encrypted before being transmitted across a network using a user device (such as a smartphone), which may contain a malicious application. The encryption of the data before the data is received in the user device prevents a malicious application from reading or manipulating the data.

Aspects of the subject matter described herein may be useful alone or in combination with one or more other aspect described herein. Without limiting the foregoing description, in a first aspect of the present disclosure, a system for providing security to user-entered inputs includes a security device that is communicatively coupled between an input device and a processor of a user device and a security server communicatively coupled between the user device and an application server. The security device is configured to receive a string of characters from the input device that correspond to inputs made by a user into a web browser or application on the user device that is in communication with the application server. The security device is also configured to add at least one security character to the string of characters to generate a watermark string, and transmit the watermark string to the user device. The security device is configured to format the at least one security character such that only the string of characters are displayed in the web browser or the application at the user device. The example security server is configured to receive the watermark string from the user device, use at least one rule to identify the at least one security character within the watermark string, and compare the at least one security character to one or more security rules. The security server is also configured to remove the at least one security character from the watermark string, and enable the application server to receive the string of characters for processing if the at least one security character matches at least one security rule.

In accordance with a second aspect of the present disclosure, which may be used in combination with any other aspect listed herein unless stated otherwise, the security server is configured to receive the watermark string from an event listener on the web browser or the application on the user device.

In accordance with a third aspect of the present disclosure, which may be used in combination with any other aspect listed herein unless stated otherwise, the at least one security character includes an identifier comprised of one or more identifier characters and a delete key input or a backspace key input after each of the one or more identifier characters such that the one or more delete key inputs or the backspace key inputs cause the identifier not to be displayed at the user device.

In accordance with a fourth aspect of the present disclosure, which may be used in combination with any other aspect listed herein unless stated otherwise, the security processor is configured to use the one or more identifier characters for selecting the one or more security rules from among a plurality of security rules and use the at least one security character that does not include identifier characters for comparison to the selected one or more security rules.

In accordance with a fifth aspect of the present disclosure, which may be used in combination with any other aspect listed herein unless stated otherwise, the security processor is configured to add the at least one security character by applying at least one watermark rule to a first character of the string of characters entered by the user.

In accordance with a sixth aspect of the present disclosure, which may be used in combination with any other aspect listed herein unless stated otherwise, the security processor is configured to add the at least one security character by applying at least one watermark rule to each of the characters of the string of characters entered by the user.

In accordance with a seventh aspect of the present disclosure, which may be used in combination with any other aspect listed herein unless stated otherwise, the security processor is configured to add the at least one security character by applying a different watermark rule to each of the characters of the string of characters entered by the user.

In accordance with an eighth aspect of the present disclosure, which may be used in combination with any other aspect listed herein unless stated otherwise, the at least one security character includes a hidden character or a non-displayable character.

In accordance with a ninth aspect of the present disclosure, which may be used in combination with any other aspect listed herein unless stated otherwise, the input device includes a touchscreen device and the security device is connected to a communication bus between the touchscreen device and a processor of the user device.

In accordance with a tenth aspect of the present disclosure, which may be used in combination with any other aspect listed herein unless stated otherwise, the security server is configured to prevent the application server from receiving the string of characters if the at least one security character fails to match at least one security rule.

In accordance with an eleventh aspect of the present disclosure, which may be used in combination with any other aspect listed herein unless stated otherwise, the security server is configured to transmit an alert message to at least one of the application server or the user device indicative of a malicious application if the at least one security character fails to match at least one security rule.

In accordance with a twelfth aspect of the present disclosure, which may be used in combination with any other aspect listed herein unless stated otherwise, the security device includes a private key that defines the at least one security character, and the security device is configured to identify a public key based on the at least one security character, identify a public key that corresponds to the at least one security character, and select the one or more rules as rules that correspond to the identified public key.

In accordance with a thirteenth aspect of the present disclosure, which may be used in combination with any other aspect listed herein unless stated otherwise, the security server is configured to enable the application server to receive the string of characters for processing after the user submits the string of characters for transmission to the application server.

In accordance with a fourteenth aspect of the present disclosure, which may be used in combination with any other aspect listed herein unless stated otherwise, a security device apparatus for providing security to user-entered inputs includes a universal serial bus ("USB") port configured to receive a USB connector of an input device, a connector configured to connect to a port of a user device, and a security processor communicatively coupled to the USB port and the USB connector. The security processor configured to receive a string of characters from the input device that correspond to inputs made by a user on the user device into a web browser or application that is in communication with an application server. The security processor is also configured to add at least one security character to the string of characters to generate a watermark string where the at least one security character includes an identifier comprised of one or more identifier characters and a delete key input or a backspace key input after each of the one or more identifier characters. The processor is further configured to transmit the watermark string to the user device. The security processor is configured to format the at least one security character such that only the string of characters are displayed in the web browser or the application at the user device.

In accordance with a fifteenth aspect of the present disclosure, which may be used in combination with any other aspect listed herein unless stated otherwise, the input device includes a keyboard and the security device apparatus is connected in-line between the input device and the user device.

In accordance with a sixteenth aspect of the present disclosure, which may be used in combination with any other aspect listed herein unless stated otherwise, the apparatus further includes a memory device configured to store at least one watermark rule, wherein the security processor is configured to add the at least one security character by applying the at least one watermark rule to at least one of a first character of the string of characters entered by the user, and each of the characters of the string of characters entered by the user.

In accordance with a seventeenth aspect of the present disclosure, which may be used in combination with any other aspect listed herein unless stated otherwise, the at least one security character includes a hidden character or a non-displayable character.

In accordance with an eighteenth aspect of the present disclosure, which may be used in combination with any other aspect listed herein unless stated otherwise, the at least one security character includes at least one of an identifier or a randomly generated character.

In accordance with a nineteenth aspect of the present disclosure, which may be used in combination with any other aspect listed herein unless stated otherwise, the security processor is configured to add the identifier to a first set of characters entered by the user and add randomly generated characters to a second set of characters entered by the user.

In accordance with a twentieth aspect of the present disclosure, which may be used in combination with any other aspect listed herein unless stated otherwise, the connector is at least one of a USB connector or a wireless connector and the port of the user device includes respectively at least one of a USB device port or a wireless port.

In accordance with a twenty-first aspect of the present disclosure, any of the structure and functionality illustrated and described in connection with FIGS. 2 to 21 may be used in combination with any of the structure and functionality illustrated and described in connection with any of the other of FIGS. 2 to 21 and with any one or more of the preceding aspects.

In light of the aspects above and the disclosure herein, it is accordingly an advantage of the present disclosure to provide a security device provided in-line between an input device and a user device to enable user-entered text to be validated or authenticated.

It is another advantage of the present disclosure to provide a system that combines security characters with user-entered text for preventing malicious applications from deciphering or interfering with communications between a user device and a security server.

It is yet another advantage of the present disclosure to provide a mobile endpoint device that encrypts data for transmission to an application server by communicating with a user device using a short-range wireless protocol and a proxy server to decrypt the data.

The advantages discussed herein may be found in one, or some, and perhaps not all of the embodiments disclosed herein. Additional features and advantages are described herein, and will be apparent from, the following Detailed Description and the figures.

DETAILED DESCRIPTION

Figure 1:
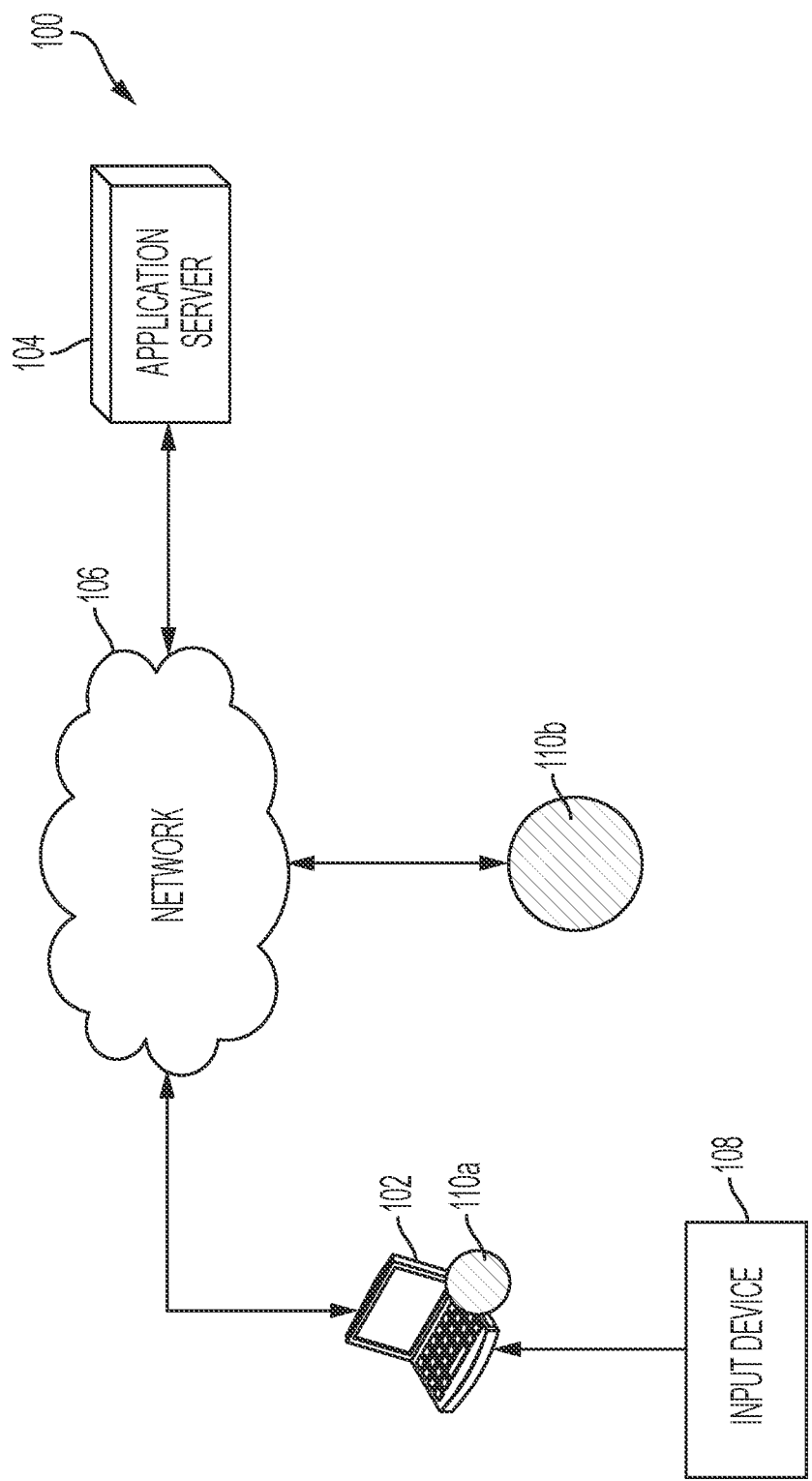
FIG. 1 shows a diagram of a known network communications system.

The present disclosure generally relates to network, device, and database security. More specifically, the present disclosure provides for a method, apparatus, and system to validate inputs from an input device for enhancing network security, a method, apparatus, and system that includes a security device in communication with a mobile device over an air-gap to enhance device security, and a method, apparatus, and system for transforming database requests to enhance database security.

Throughout the disclosure, reference is made to malicious applications (e.g., malware), which can include any computer virus, counterfeit hardware component, unauthorized third party access, computer worm, Trojan horse, rootkit, spyware, adware, or any other malicious or unwanted software that interferes with communications between client devices and servers. Malicious applications can interfere with communications of a live session between a server and a user device by, for example, acquiring credentials from a client device or server, using a user device to instruct the server to move resources (e.g., money) to a location associated with the malicious application, injecting information into a form, injecting information into a webpage, capturing data displayed to a user, manipulating data flow between a user device and a server, or impersonating a user device using stolen credentials to acquire user device resources.

Additionally, throughout the disclosure, reference is made to user devices, which can include any cellphone, smartphone, personal digital assistant ("PDA"), mobile device, tablet computer, computer, laptop, server, processor, console, gaming system, multimedia receiver, or any other computing device. While this disclosure refers to connection between a single user device and a server, the example method, apparatus, and system disclosed herein can be applied to multiple user devices connected to one or more servers.

Input Device Security Embodiment

The present disclosure provides for an example method, apparatus, and system to enable validation of inputs from an input device to provide an indication that the inputs are from an expected user as opposed to a malicious application. In other words, the authentication provides an indication that a legitimate user is entering information into a webpage or application instead of inputs provided by a malicious application. The example method, apparatus, and system are configured to provide authentication by supplementing a user's input with at least one additional input (e.g., a security input) that is used to provide an indication of a user's legitimacy. The example method, apparatus, and system also provide security by preventing user-entered information (such as usernames, passwords, credit card information, etc.) from being stolen because the user-entered information is combined with the security input, which is indecipherable to a malicious application expecting only the user-entered information. The example method, apparatus, and system are configured to structure the at least one additional input such that the additional input is not apparent to the user (e.g., the user cannot see it on a device's screen), and undetectable by a malicious application (e.g., malware).

The example method, apparatus, and system are configured to operate with any type of input device including a laptop keyboard, a peripheral keyboard (including physical and virtual keyboards), a peripheral mouse/trackball, a touchpad, a touchscreen, etc. For example, the method, apparatus, and system may be configured to operate with the PS/2 protocol, a universal serial bus ("USB") protocol, a human interface link protocol, a Bluetooth® protocol, a High-Definition Multimedia Interface ("HDMI") protocol, an Apple® desktop bus protocol, etc. Each of the input devices provides a respective user-entered input to a user device, such as a laptop computer, desktop computer, workstation, smartphone, tablet computer, etc. The example system, method, and apparatus disclosed herein receives the user-provided input and adds at least one additional security input. For example, a security input for a keyboard includes key inputs (e.g., a letter key, spacebar, delete key, etc.) while a security input for a touchscreen includes screen coordinates or other touch gestures.

The example method, apparatus, and system are configured to add the security input to inputs provided by a user in such a manner that the security inputs are not visible or otherwise noticeable by the user. For keyboard inputs, this may include adding security inputs that include 'delete' or 'backspace' keys that provide instructions for a processor to remove the added security inputs before they are displayed to a user (or displayed but deleted within a short duration that is not noticeable by the user). For touchscreen or mouse movements, the security inputs may include offsetting coordinates that ultimately return a cursor (e.g., a pointer) or screen location to a location specified by a user.

The example security inputs are transmitted with the user-provided inputs to a webpage or web application, which may use an event listener (e.g., event logger) to acquire inputs before a user submits information to the webpage or application. The example system, method, and apparatus disclosed here may include a security server that is located between the user device and the webpage/web application. The security server is configured to process the user inputs, including the security inputs. The security server uses the processed security inputs to confirm the user-provided inputs have originated from a legitimate input device of the user, instead of a malicious application. The security server removes the security inputs from the input stream or message(s) and transmits the user-provided inputs (or at least the authenticated user-provided inputs) to the intended application server.

Examples in this disclosure describe user devices and servers performing banking transactions. However, the example method, apparatus, and system for input device security disclosed herein can be applied to any type of transaction or controlled usage of resources between a server and a user device including, but not limited to, online purchases of goods or services, point of sale purchases of goods or services (e.g., using Near Field Communication), medical applications (e.g., intravenous medication as dispensed by an infusion pump under the control of a computer at a nurses station or medication as delivered to a home address specified in a webpage), manufacturing processes (e.g., remote manufacturing monitoring and control), infrastructure components (e.g., monitoring and control of the flow of electricity, oil, or flow of information in data networks), transmission of information with a social network, or transmission of sensitive and confidential information.

FIG. 1 shows a diagram of a known network communications system 100. The illustrated known system 100 includes a user device communicatively coupled to an application server 104 via a network 106. An input device 108, such as a keyboard, is communicatively coupled to the user device 102 via, for example, a USB connection or connector. A malicious application 110 may be present at an infected endpoint on the user device 102 (e.g., malicious application 110a) or may be connected to the user device 102 via the network 106, such as a live hacker or bot at a server remotely accessing the user device 102 (e.g., malicious application 110b).

The malicious application 110 is capable of infecting the user-space, kernel, and/or hardware of the user device 102. In other instances, the malicious application 110 may have been built into the hardware to perform certain operations that are not expected and undetectable by an end user. For instance, the malicious application may log and transmit certain data to a state-actor or other malicious recipient. As such, data originating from the user device 102 cannot be trusted by the application server 104 because the data may, in fact, originate from the malicious application 110. For instance, user-generated data requests (appearing from the user device 102) are received at the application server 104. The data requests may include, for example, passwords, wire transfer requests, file uploads/downloads, etc. The malicious application 110 may automate or script a response so that it appears to come from the legitimate user device 102, but instead comes from the malicious application 110. Although legitimate user inputs from the input device 108 may also be provided, the application server 104 cannot differentiate between inputs received from the input device 108 and from the malicious application 110. Thus, the application server 104 processes all inputs received, thereby placing the user at risk from the malicious applications 110.

Figure 2:
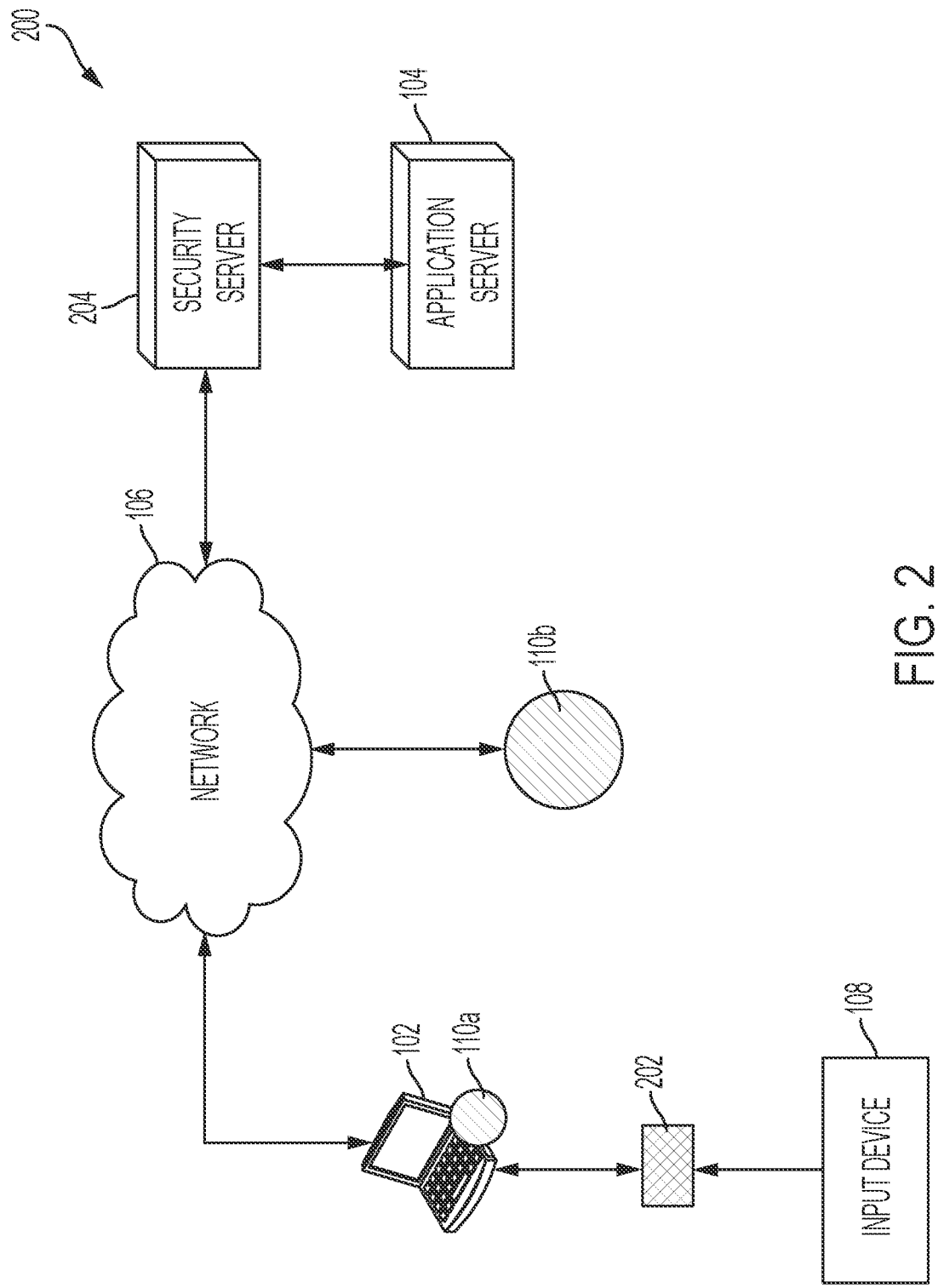
FIG. 2 shows a network communications system including a security device and a security server, according to an example embodiment of the present disclosure.

FIG. 2 shows an example network communications system 200 with a security device 202 and a security server 204, according to an aspect of the present disclosure. A user device 102 communicates with an application server 104 through a network 106 and the security server 204. In some aspects, the security server 204 and the security device 202 do not require any modifications to the known network communications system 100. Instead, the security device 202 and the security server 204 may be installed and operate with an already provisioned system. For instance, the security device 202 may be connected to a user device 102 at an input port, such as a USB port, a micro-USB port, an HDMI port, etc., and may communicate with the security server 204, which may communicate with the application server 104.

The network 106 can include, for example, the Internet or some other data network, including, but not limited to, any suitable wide area network or local area network. It should be appreciated that any of the devices described herein may be directly connected to each other and/or connected through the network 106. The network 106 may also support wireless communication with wireless user devices 102. The user devices 102 use the network 106 to access data, services, media content, and any other type of information located on the application server 104. The user devices 102 may include any type of operating system and perform any function capable of being performed by a processor. For instance, the user devices 102 may access, read, and/or write information corresponding to services hosted by the application server 104.

In various examples, the application server 104 processes one or more of a plurality of files, programs, data structures, databases, and/or web pages in one or more memories for use by the user devices 102, and/or other servers 104. The application server 104 may provide services accessible to the user devices 102 or provide a framework for the user devices 102 to access data stored in a database. The application server 104 may be configured according to its particular operating system, applications, memory, hardware, etc., and may provide various options for managing the execution of the programs and applications, as well as various administrative tasks. The application server 104 may interact via one or more networks with one or more other servers 104, which may be operated independently. While the application server 104 is shown as a single individual entity, the application server 104 may be partitioned or distributed within a network. For instance, the application server 104 may be implemented within a cloud computing network with different processes and data stored at different servers or processors. Additionally, multiple servers or processors located at different geographic locations may be grouped together. In this instance, network routers determine which user device 102 connects to which processor within the application server 104.

The example application server 104 provides data and services to the user devices 102. The application server 104 may be managed by one or more service providers, which control the information and types of services offered. These services providers also determine qualifications as to which user devices 102 are authorized to access the application server 104. The application server 104 can provide, for example, banking services, online retain services, social media content, multimedia services, government services, educational services, etc. Additionally, the application server 104 may provide control to processes within a facility, such as a process control system. In these instances, the application server 104 provides the user devices 102 access to read, write, or subscribe to data and information associated with specific processes. For example, the application server 104 may provide information and control to the user devices 102 for an oil refinery or a manufacturing plant. In this example, a user of the user device 102 can access an application server 104 to view the status of various equipment within the plant or to set controls for the equipment within the plant. In some instances, the application server 104 may include one or more application programming interfaces ("APIs") for accessing data stored in a memory device or storage network.

In the illustrated example of FIG. 2, the security device 202 is configured to connect to the user device 102 via an input port, such as a USB port, a micro-USB port, an HDMI port, etc. In addition, the security device 202 is configured such that the input device 108 connects to the security device 202. Thus, in some examples, the input device 108 connects to the user device 102 via the security device 202. In some embodiments, the security device 202 may be powered via a connection to the user device 102 and/or the input device 108. Other example configurations of the network communications system 200 are depicted in FIGS. 3 to 6, as described below.

In the embodiments discussed herein, the security device 202 may be provisioned for single-directional communication for receiving and reading characters transmitted by the input device 108. In other embodiments, the security device 202 may be configured to transmit messages to the input device 108 in a bi-directional communication arrangement. Further, the security device 202 may be connected wirelessly to the user device 102 and/or the input device 108 using, for example, a Bluetooth® protocol, a near-field communication ("NFC") protocol, an RFID protocol, etc.

Figure 3:
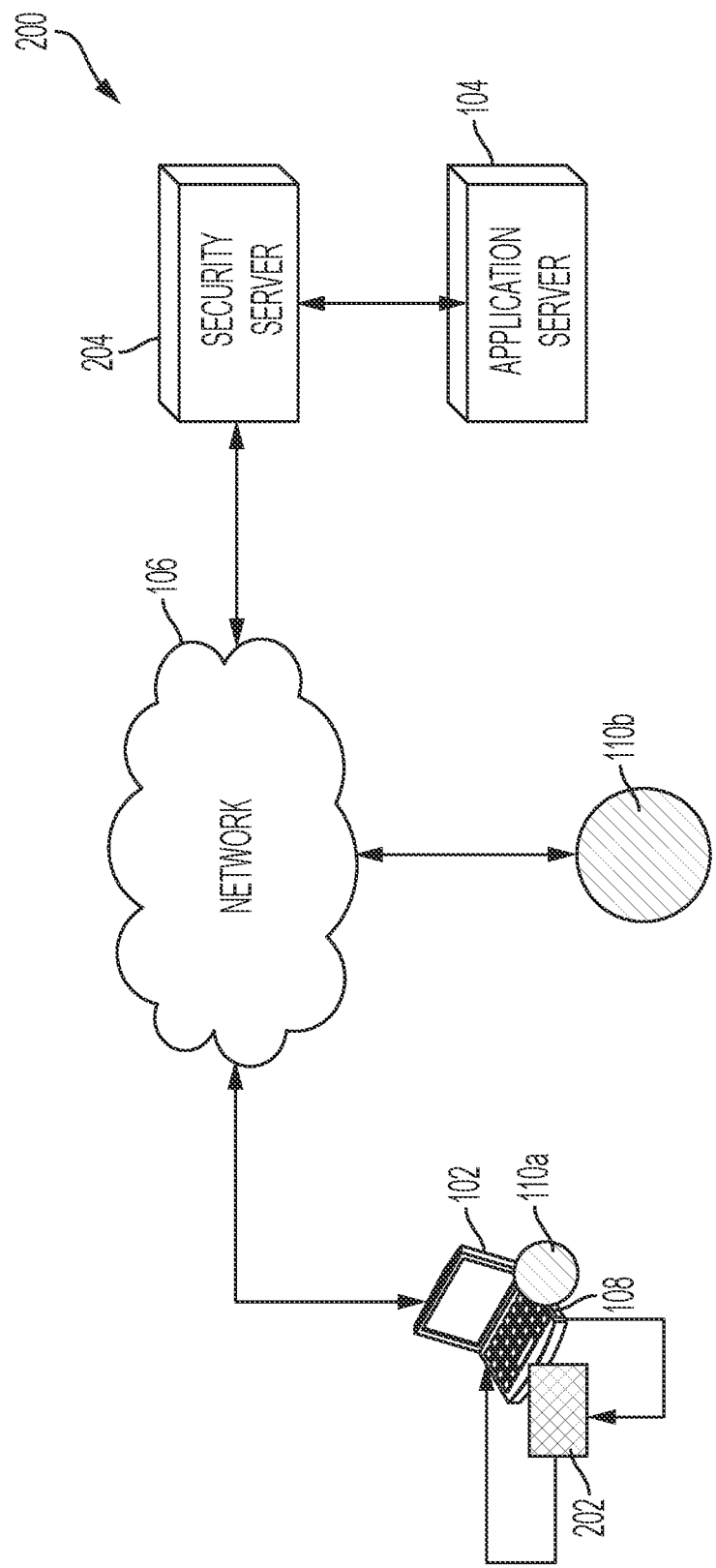
FIGS. 3 to 5 show alternative embodiments of the network communications system of FIG. 2.

For instance, FIG. 3 depicts an example network communications system 200 in which the input device 108 is included with, or otherwise integrated with, the user device 102. For example, the input device 108 may be a keyboard of a laptop, as illustrated. Accordingly, in such instances, the security device 202 is configured to connect internally to the user device 102 on one or more circuit boards or internal ports of the user device 102, rather than to an external port as in the example described in FIG. 2. In some examples, the security device 202 may be installed between a bus from the keyboard and a processor of the user device 102.

Figure 4:
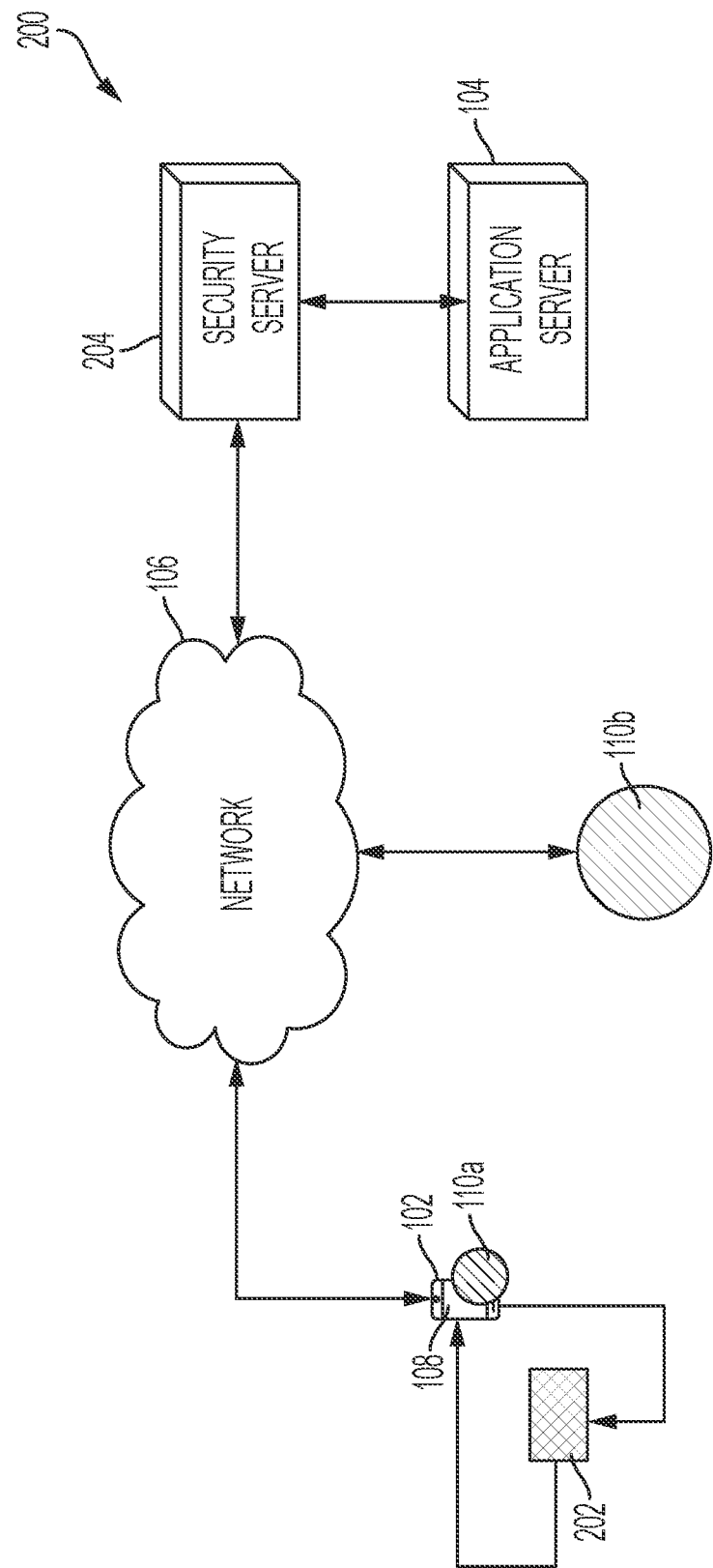

FIG. 4 shows another example network communications system 200 in which the input device 108 is included with, or otherwise integrated with, the user device 102. In this example, the input device 108 is a touchscreen of a smartphone user device 102. In other examples, the input device 108 may be a touchscreen of a tablet or laptop computer, or a touchscreen of another suitable computing device. The security device 202 in this example is configured to connect internally to the user device 102 on one or more circuit boards, buses, or internal ports of the user device 102, and may be installed between a touchscreen bus and a processor. In aspects in which the user device 102 includes a touchscreen, the user inputs may be text (e.g., from a software keyboard) or may be navigational (e.g., a swipe), both of which may be input at various locations on the touchscreen. Alternatively, the security device 202 may be defined by one or more instructions stored in a memory and executed by a processor of the user device 102 and/or the input device 108. As discussed below, the example security device 202 may add security inputs in the form of additional touch inputs related to a selected area of the touchscreen, which will be described in more detail below.

Figure 5:
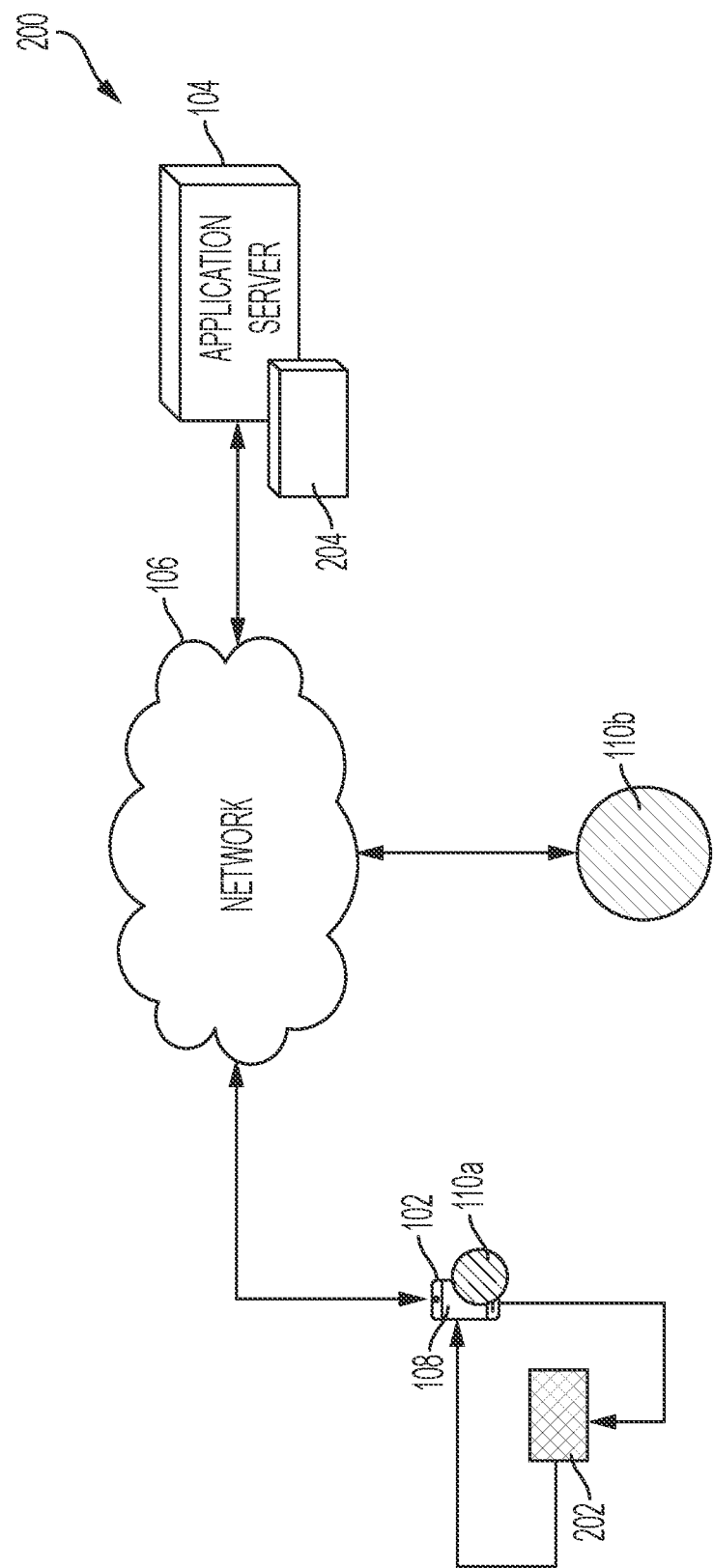

FIG. 5 shows an example network communications system 200 in which the example security server 204 is integrated with or otherwise a part of, the application server 104. In some instances, the security server 204 may be provisioned at the front-end of the application server 104 to validate inputs prior to making a decision as to whether the inputs should be processed. In some instances, the security server 204 may be implemented as an API or other security interface or gateway device to process user-provided inputs.

Figure 6A:
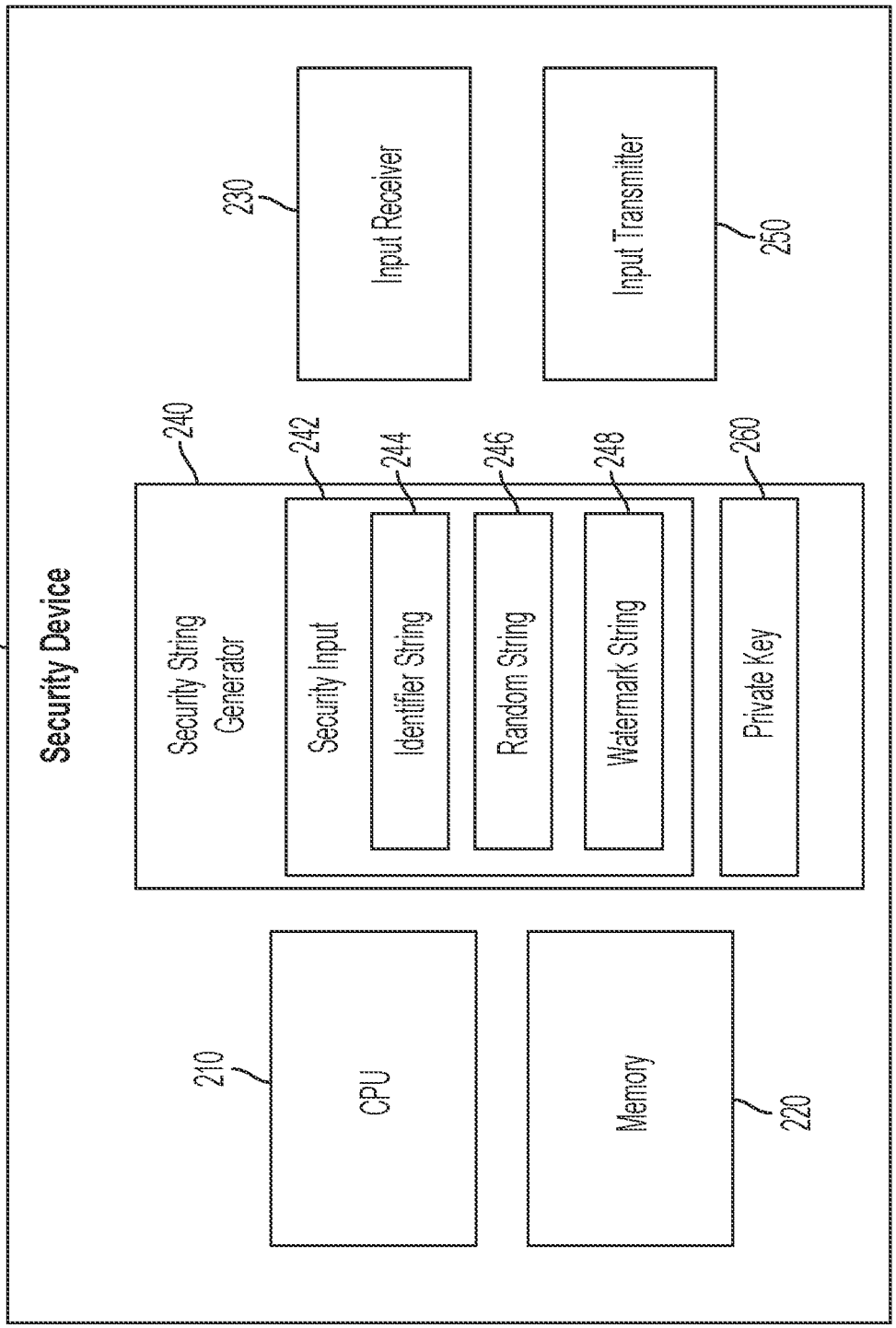
FIG. 6A shows a diagram of an example security device, according to an example embodiment of the present disclosure.

FIG. 6A shows a diagram of an example security device 202. The security device 202 includes different components that are representative of computational processes, routines, and/or algorithms. In some embodiments, the computational processes, routines, and/or algorithms may be specified in one or more instructions stored on a computer readable medium that, when executed by a processor of the security device 202, cause the security device 202 to perform the operations discussed herein. For example, all or part of the computational processes, routines, and/or algorithms may be implemented by a CPU 210 and a memory device 220. In other examples, the components of the security device 202 may be combined, rearranged, removed, or provided on a separate device or server.

The example security device 202 is programmed to detect and determine user inputs, and in response, generate security inputs 242 that the security device 202 provides with the user inputs to a user device 102. The example security device 202 includes an input receiver 230, a security string generator 240, and an input transmitter 250. The input receiver 230 is programmed to recognize user inputs from an input device 108. In various examples, the input receiver 230 converts signals from the input device 108 into digital data (e.g., the intended user input). The security string generator 240 is programmed to generate and provide a security input 242 and combine it with the user input. Based on the digital data from the input receiver 230, the security string generator 240 uses one or more predefined rules to create security inputs 242 that may include an identifier string 244, a random string 246, and/or a watermark string 248. The predefined rules are secretly held at the security device 202 and the security server 204 so that a malicious application 110 cannot imitate the security measures of the present disclosure. The input transmitter 250 is programmed to transmit the combined user input and security input 242 to the user device 102 (thereby mimicking the output type of the input device 108). The user device 102 receives and processes the signals within an application and/or webpage displayed in a web browser to which a user is providing inputs.

In various examples, the security string generator 240 is programmed to provide security inputs 242 in a manner that is not noticeable by a user of the user device 102, while also providing enough information to supply an authenticating indication. For instance, in some examples, the security inputs 242 are not displayed on a screen of the user device 102, or in other examples, are displayed for an amount of time (and/or in a font size, font type, color, etc.) such that the security inputs 242 are not perceptible by a user. In other words, the security device 202 is configured such that only inputs provided by the user are viewable to the user. The security inputs 242 may nevertheless be transmitted and the security server 204 may use the identifier string 244 to identify the security device 202, and accordingly identify the watermark rules programmed into the security device 202, so that the security server 204 may authenticate the input received from the user device 102 using the random string 246, the watermark rules, and/or the watermark string 248.

In one example, a user may input the keystroke "H" into an input device 108 that is connected to, or integrated with, a security device 202 with an ID of "Z22". In such an instance, the security string generator 240 may generate an identifier string 244 of: H~DEL SPACE DEL @DEL Z DEL 2 DEL 2 DEL. In the example identifier string 244, "H" is the input that was typed by the user at the input device 108. The sequence of characters "~DEL SPACE DEL @ DEL" is a string that informs the security server 204 that what follows next is the ID of the security device 202. The sequence of characters "Z DEL 2 DEL 2 DEL" is the ID (i.e., Z22) of the security device 202. The characters "DEL" represents a command for the delete or backspace key. Accordingly, when the security device 202 transmits the identifier string 244 to the user device 102, the only character that appears on the screen of the user device 102 is "H", the input that the user entered, because the remaining characters are deleted, as commanded by at least some security inputs, by a processor of the user device 102. The entire identifier string 244, however, may be read by various programs or applications, such as an event logger that tracks user typing or cursor movement. For instance, the security device 202 is configured to cause the entire identifier string 244 to be transmitted by the user device 102 to the security server 204 via a key logging program, a security application, or the application/web browser being used by the user.

Additionally or alternatively, the user may desire to type the word "HELLO" with the input device 108. In some examples, the security device 202 generates and transmits an identifier string 244 for each letter as each letter is typed. In other examples, the security device 202 generates and transmits an identifier string 244 for only the first letter of any given word. In other examples, an identifier string 244 is only generated once for a given session of a user utilizing the input device 108. In other examples, the identifier string 244 is generated other suitable numbers of times to ensure the security server 204 may authenticate the inputs from the user device 102. After one or more identifier strings 244 have been transmitted to the user device 102, the security string generator 240 may provide a random string 246 of characters. The random string of characters 246 along with the private watermark rules enable the security device 202 (e.g., the security string generator 240) to generate a watermark string 248.

For instance, the security string generator 240 may generate a watermark string 248 of: H w1(H) DEL E w2(E) DEL L w3(L) DEL L w4(L) DEL O w5(O) DEL. The character sequence w1(H) denotes the first watermark rule generated with the random string 246 as applied to the letter "H". The character sequence w2(E) denotes the second watermark rule as applied to the letter "E" and so forth. As with the identifier string 244, the "DEL" commands result in the only characters displayed on the screen of the user device 102 being "HELLO", which is what was input by the user. The security server 204 may authenticate the transmitted input from the user device 102 using the watermark rules and the watermark string 248, and if authenticated, may discard the extra characters before transmitting "HELLO" to the application server 104.

In some examples, the security device 202 (e.g., the security string generator 240) may add security inputs 242 such as hidden characters, non-displayable characters, etc. that are otherwise not displayable at the user device 102 (e.g., in a webpage or application) when generating identifier strings 244 and/or watermark strings 248. In such examples, the security device 202 does not need to add a DEL security input. Instead, the security server 204 removes the non-displayable characters or instructs the application server 104 to ignore the non-displayable characters. In some aspects, the security server 204 may inject code or security inputs 242 into a session with a user device 102. The injected code may instruct the application server 104 to ignore or otherwise disregard default behavior, called "prevent default". In this manner, security related inputs do not show up or are displayed even though at least some security inputs may be received at the application server 104 from the user device 102.

It should be appreciated that the security device 202 does not encrypt or otherwise change the inputs received from the input device 108. Encrypting the inputs would cause the encrypted input, rather than the input, to be displayed in a text field of a webpage or web application on the user device 102, and thus users would not be able to decipher on the screen what they typed. Further, it should also be appreciated that encryption at the user device 102 cannot provide the level of security that the present disclosure provides because a malicious application 110 can provide inputs prior to encryption and transmission over the network 106. Thus, a user device 102 would merely be encrypting the inputs from the malicious application 110.

In some embodiments, the security device 202 may include a secret or private key 260 that is known to the security server 204, but not known to the user device 102 or the application server 104. The secret or private key 260 may define the one or more watermark rules for creating security inputs 242 and/or combining security inputs 242 with user-provided inputs. Thus, the security server 204 may identify a public key 332 (FIG. 6B) corresponding to the private key 260 of a specific security device 202 based on a received identifier string 244, and then may authenticate the watermark string 248 using the public key 332. In some aspects, the secret or private key 260 may be provided at the time of manufacture of the security device 202. After startup in such aspects, the security device 202 is configured to broadcast its identifier (e.g., the public key 332 corresponding to the private key 260) to the security server 204 (and/or other security servers) to register its identifier. The identifier may also be preprogrammed into the one or more security servers 204 when the security device 202 is created. Additionally or alternatively, after startup, the security device 202 may request a key from the security server 204, which is used to create a private key using one or more internal routines or algorithms.

Figure 6B:
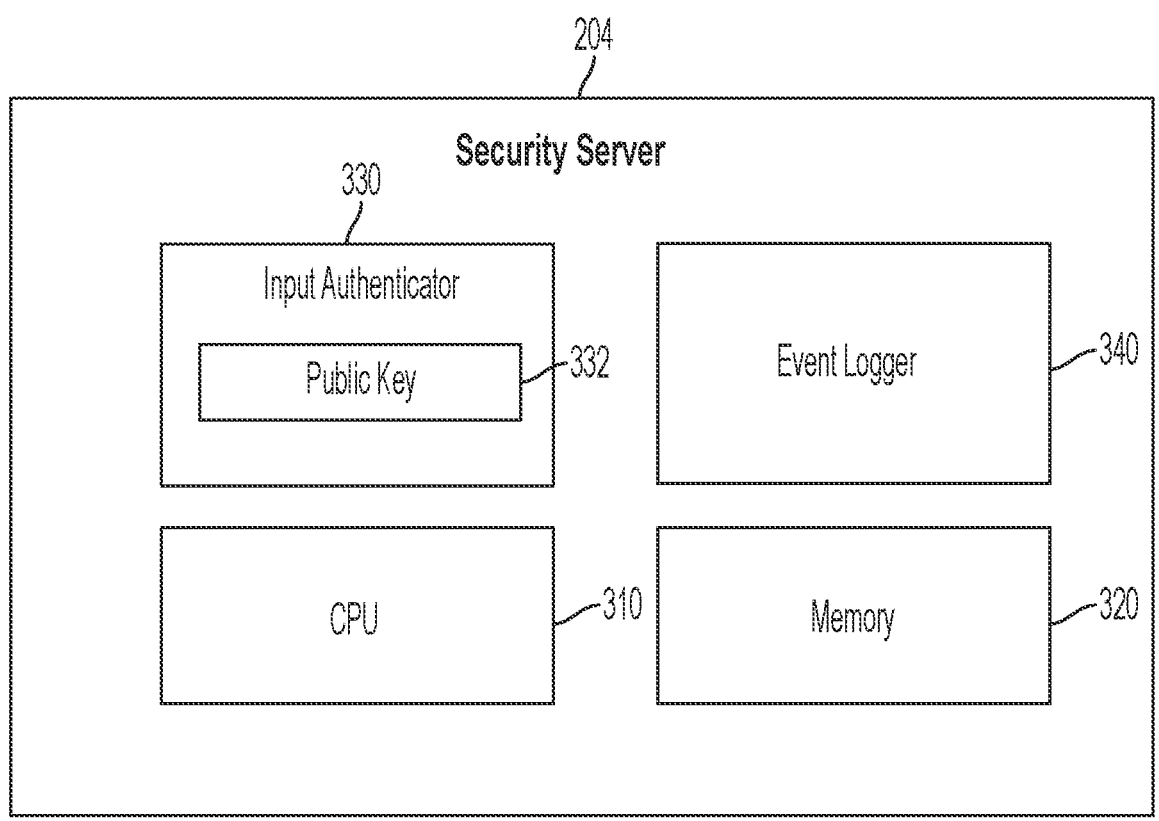
FIG. 6B shows a diagram of an example security server, according to an aspect of the present disclosure.

FIG. 6B shows a diagram of an example security server 204, according to an aspect of the present disclosure. The security server 204 includes different components that are representative of computational processes, routines, and/or algorithms. In some embodiments, the computational processes, routines, and/or algorithms may be specified in one or more instructions stored on a computer readable medium that, when executed by a processor of the security server 204, cause the security server 204 to perform the operations discussed herein. For example, all or part of the computational processes, routines, and/or algorithms may be implemented by a CPU 310 and a memory device 320. In other examples, the components of the security server 204 may be combined, rearranged, removed, or provided on a separate device or server.

The example security server 204 includes an input authenticator 330, which may store the public key 332 described above. The input authenticator 330 is programmed to receive and process user inputs and security inputs 242 to determine if the user inputs are authenticated. If the received security inputs 242 can be validated or authenticated, in some examples, the input authenticator 330 enables the user inputs to the transmitted to the application server 104. In other examples, the input authenticator 330 may additionally or alternatively transmit a message to the application server 104 indicating that the user inputs can be trusted. If the security inputs 242 cannot be validated, the input authenticator 330, in some examples, may block the transmission of the user inputs to the application server 104. In other examples, the input authenticator 330 may additionally or alternatively transmit a message to the application server 104 indicating that the user inputs are to be discarded or disregarded. In some instances, the message may include an alert that causes the application server 104 to block the user device 102.

In some aspects of the present disclosure, the example security server 204 includes an event logger 340 to receive the security inputs 242. For instance, the event logger 340 may track user typing and/or cursor movement to receive the security inputs 242. In other instances, the security server 204 may additionally or alternatively rely on an event logger of a webpage or web application that causes the security inputs 242 to be detected and transmitted from the user device to the security server 204.

The example security device 202 and security server 204 accordingly provide for the unambiguous identification of the input device 108 as the origin of user inputs received at the security server 204 in a way that is not possible for a malicious application 110 to imitate. The example security device 202 provides for this unambiguous identification without disturbing the user experience. Further, in many embodiments, the security device 202 is configured to reject inputs from or otherwise not respond to the user device 102, thereby making it virtually impossible for the malicious application 110 to infect the security device 202.

Figure 7:
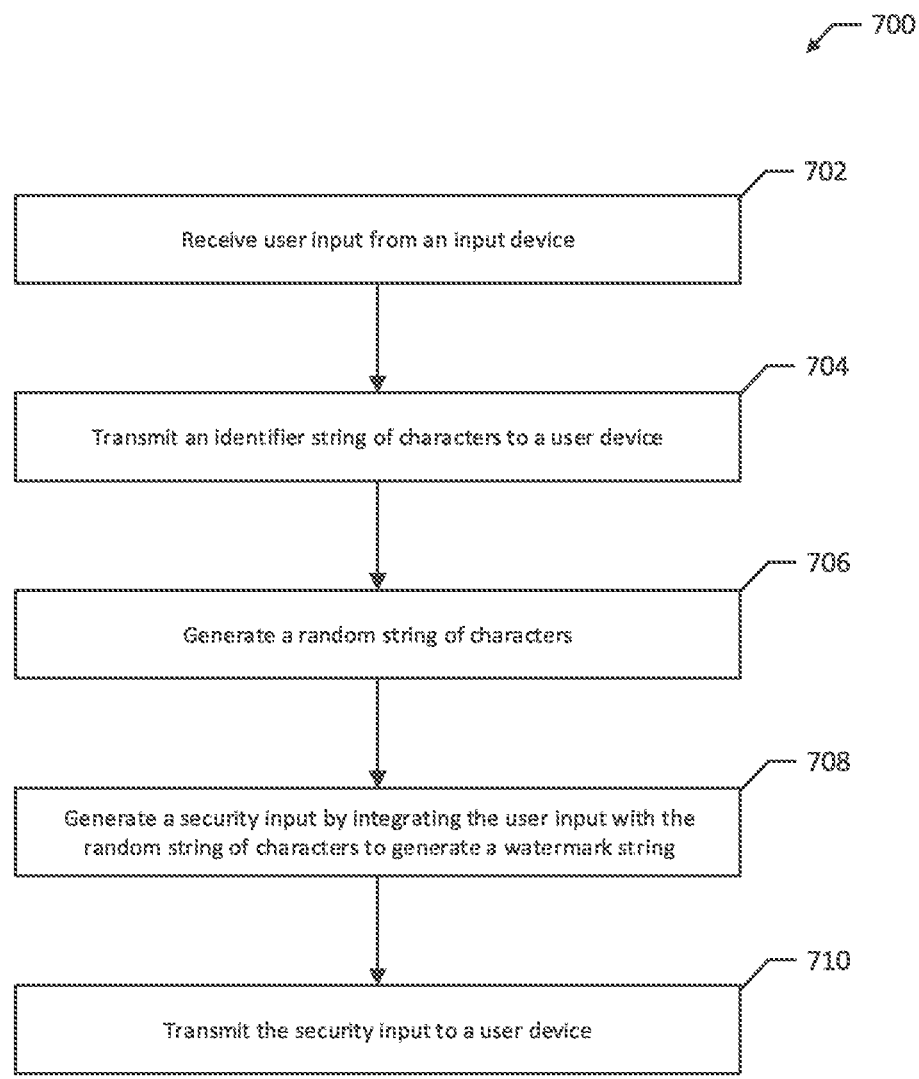
FIG. 7 shows a flow diagram of an example method performed by the security device of FIG. 6A for validating inputs entered by user, according to an example embodiment of the present disclosure.

FIG. 7 shows a diagram of an example method 700 according to an aspect of the present disclosure. The method 700 may be implemented on a computer system, such as the security device 202. For example, the method 700 may be implemented by the input receiver 230, the security string generator 240, and/or the input transmitter 250. In some instances, the method 700 may be implemented by a set of instructions stored on a computer readable medium that, when executed by a processor, cause the processor to perform the method. For example, all or part of the method 700 may be implemented by the CPU 210 and the memory device 220. Although the examples below are described with reference to the flowchart illustrated in FIG. 7, many other methods of performing the acts associated with FIG. 7 may be used. For example, the order of some of the blocks may be changed, certain blocks may be combined with other blocks, one or more of the blocks may be repeated, and some of the blocks described may be optional.

The method 700 begins at step 702, where a device (e.g., the security device 202) receives a user input from an input device (e.g., the input device 108). At step 704, the device transmits an identifier string of characters (e.g., the identifier string 244) to a user device (e.g., the user device 102). At step 706, the device generates a random string of characters (e.g., the random string 246). At step 708, the device generates a security input (e.g., the security input 242) by integrating the user input with the random string of characters to generate a watermark string (e.g., the watermark string 248). The random string of characters may include one or more backspace or delete entries/characters to prevent other random string characters from being displayed at the user device. At step 710, the device transmits the security input to the user device.

Figure 8:
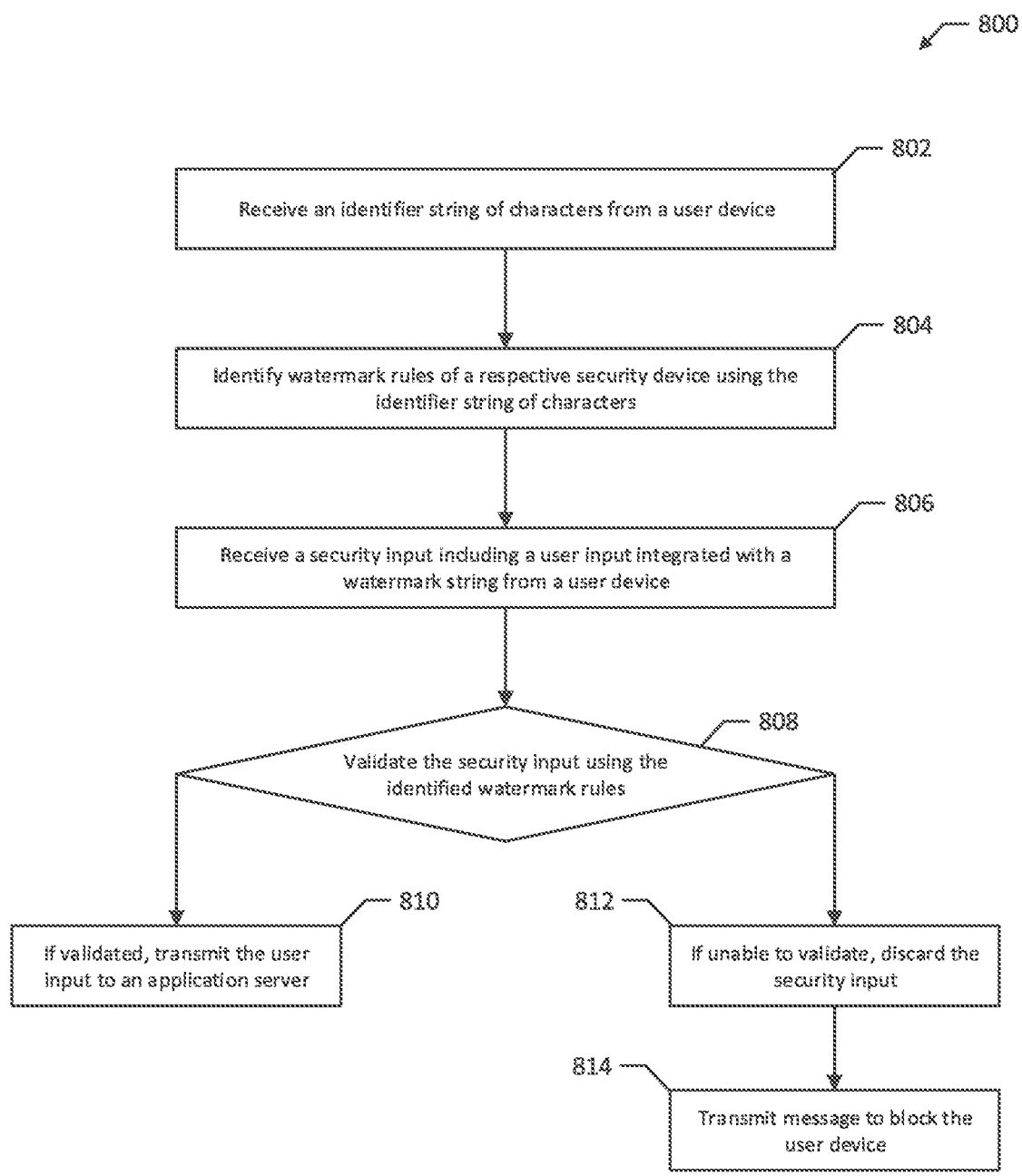
FIG. 8 shows a flow diagram of an example method performed by the security server of FIG. 6B for validating inputs entered by user, according to an example embodiment of the present disclosure.

FIG. 8 shows a diagram of an example method 800 according to an aspect of the present disclosure. The method 800 may be implemented on a computer system, such as the security server 204. For example, the method 800 may be implemented by the input authenticator 330 and/or the event logger 340. The method 800 may be defined by a set of instructions stored on a computer readable medium that, when executed by a processor, cause the processor to perform the method disclosed herein. For example, all or part of the method 800 may be implemented by the CPU 210 and the memory device 220. Although the examples below are described with reference to the flowchart illustrated in FIG. 8, many other methods of performing the acts associated with FIG. 8 may be used. For example, the order of some of the blocks may be changed, certain blocks may be combined with other blocks, one or more of the blocks may be repeated, and some of the blocks described may be optional.

The method 800 begins at step 802 when a system (e.g., the security server 204) receives an identifier string of characters (e.g., the identifier string 244) from a user device (e.g., the user device 102). The string of characters may be provided by an event logger operating in a web browser or application on the user device. At step 804, the system identifies watermark rules (e.g., the public key 332) of a respective device (e.g., the security device 202) using the identifier string of characters. At step 806, the system receives a security input (e.g., the security input 242) including a user input integrated with a watermark string (e.g., the watermark string 248) from the user device. In some instances, the security input may be included with the identifier string, or the identifier string may be omitted. At step 808, the system validates the security input using the identified watermark rules. If the security input is validated, then at step 810, the system separates the user input from the watermark string and transmits the user input to a separate server (e.g., the application server 104). If the system is unable to validate the security input, then at step 812, the system discards the security input. In some examples, at step 814, the system transmits a message to the separate server indicating that the separate server should block the user device.

Figure 9:
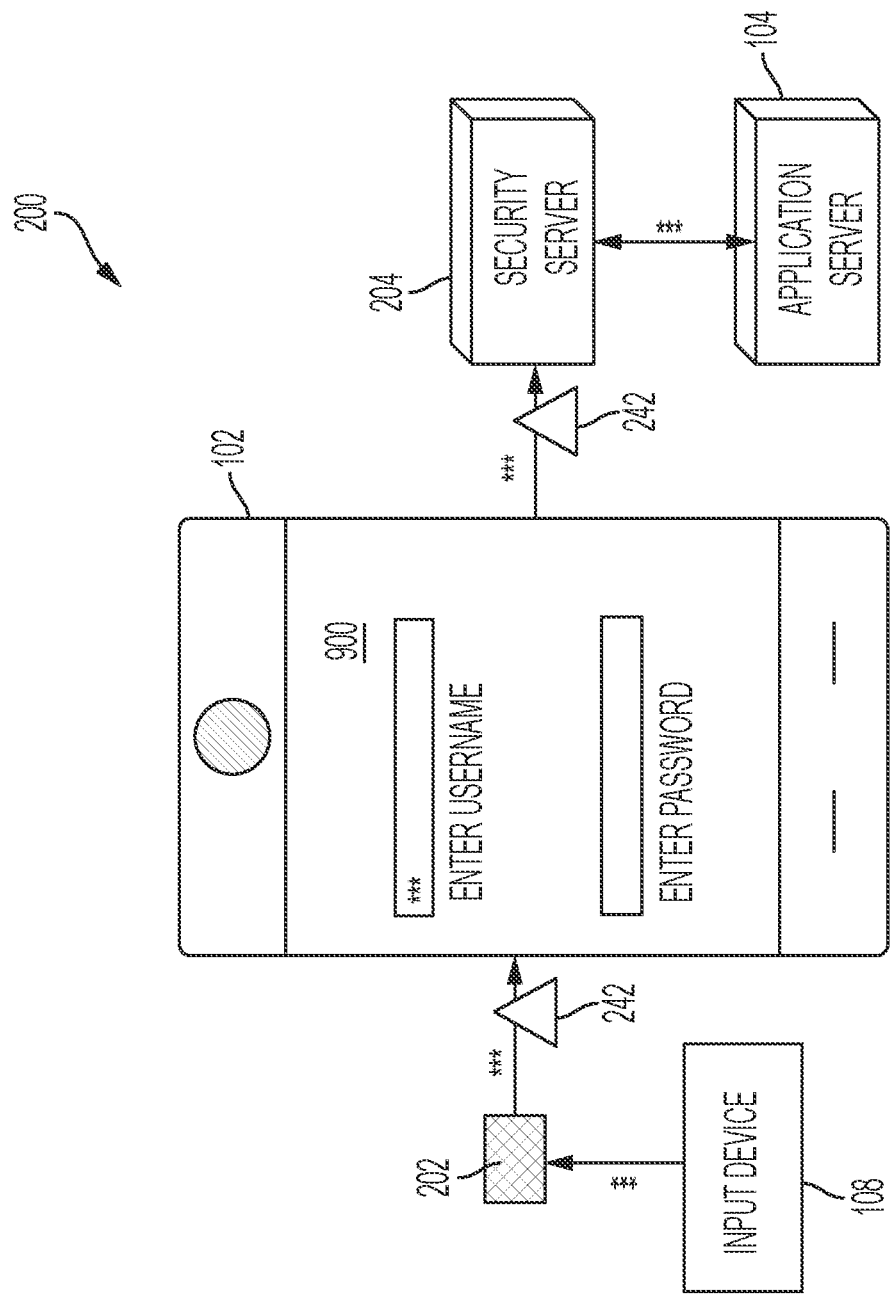
FIG. 9 shows an example of the security device and the security server of FIGS. 2 to 8 providing input device validation, according to an example embodiment of the present disclosure.

FIG. 9 shows an example of the security device 202 and the security server 204 of FIGS. 2 to 8 providing input device validation, according to an example embodiment of the present disclosure. In the illustrated example, a user device 102 is displaying an application or a webpage via a web browser 900. The application or web browser 900 includes a username field and a password field for accessing information provided by an application server 104. In the illustrated example, a user uses an input device 108 to enter a user name, which is shown as "***".

The example security device 202 is connected in-line between the input device 108 and the user device 102. The security device 202 receives the characters entered by the user and generates one or more security inputs or characters 242, as discussed herein. The security device 202 combines the one or more security inputs or characters 242 with the user-entered characters to create a watermark string. A processor on the user device 102 receives the watermark string. The processor performs the text entry operations specified by the watermark string, and accordingly only displays the text entered by the user, which is shown as "***" for a password entry using a character conversion script for the webpage or application. The use of delete or backspace entries with the one or more security inputs or characters 242 prevents the text added by the security device 202 from being displayed by the application or web browser 900.

However an event logger on the user device 102 receives the entire watermark string as through it was typed by the input device 108. In some instances, the event logger may be an operation or function defined within the web browser (webpage provided by the web browser) or the application 900. The event logger causes the watermark string (e.g., the one or more security inputs or characters 242 and the user-entered characters corresponding to "*") to be transmitted to the security server 204. The security server 204 uses one or more rules to identify the one or more security inputs or characters 242 within the watermark string. The security server 204 then compares the identified one or more security inputs or characters 242 to one or more security rules. If the comparison of the one or more security inputs or characters 242 to the one or more security rules is favorable, which is indicative that the user-input characters corresponding to displayed characters "*" are validated, the security server 204 transmits the user-entered text to the application server 104 (after the user submits the username via the application or web browser 900).

Figure 10:
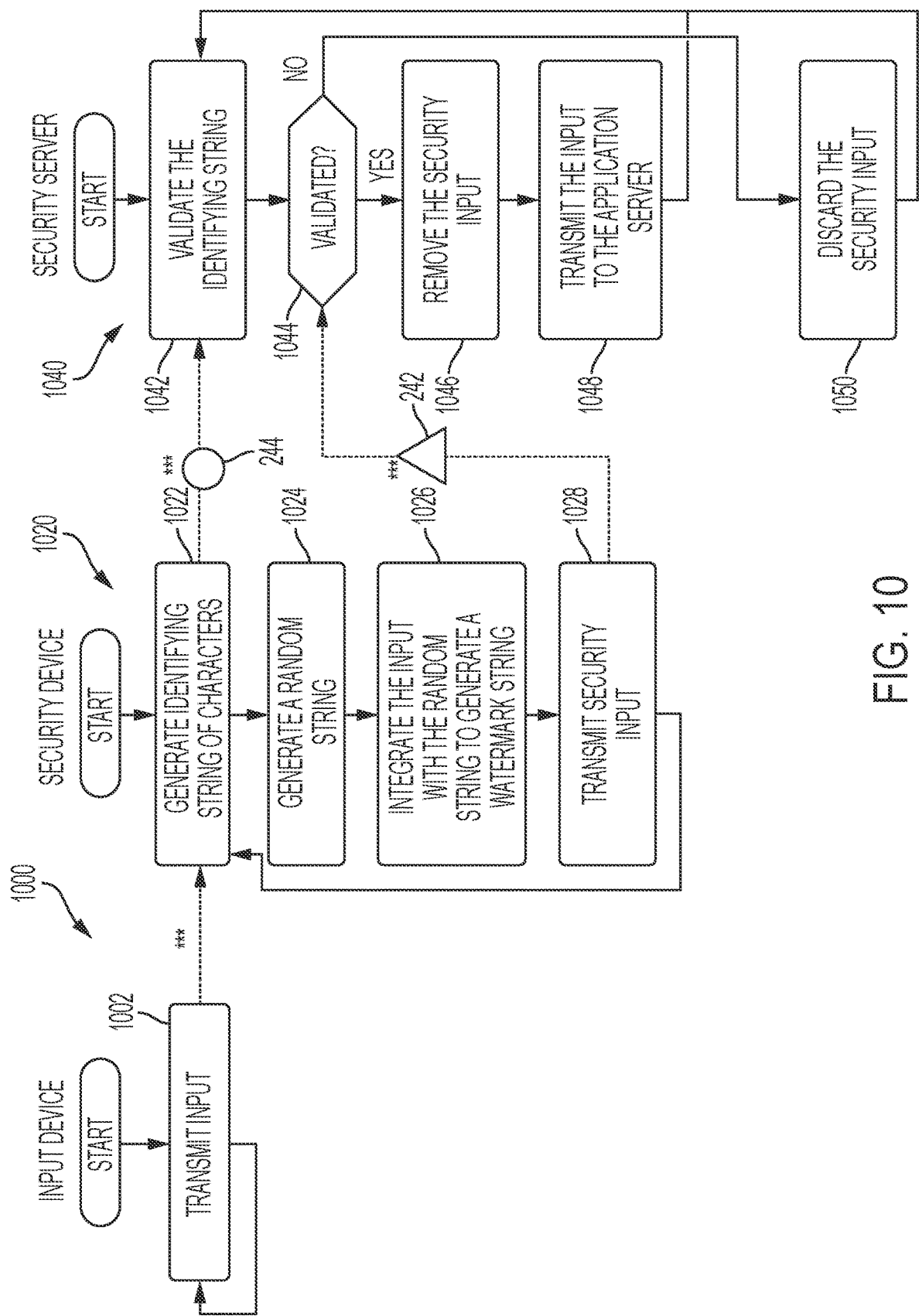
FIG. 10 shows flow diagrams of example procedures to provide input device validation, according to an example embodiment of the present invention.

FIG. 10 shows flow diagrams of example procedures 1000, 1020, and 1040 to provide input device validation, according to an example embodiment of the present invention. Although the procedures 1000, 1020, and 1040 are described with reference to the flow diagram illustrated in FIG. 10 it will be appreciated that many other methods of performing the acts associated with the procedures 1000, 1020, and 1040 may be used. For example, the order of many of the blocks may be changed, certain blocks may be combined with other blocks, and many of the blocks described are optional.

At procedure 1000, the example input device 108 transmits at least one input (block 1002). In the illustrated example of FIG. 9, the input includes "*", which is represented as text for a username field of a web application or webpage. In procedure 1020 of FIG. 10, the security device 202 receives the characters corresponding to the "*" inputs from the input device 108. In this embodiment, the security device 202 generates an identifier string 244, which is transmitted to the security server 204 via the user device 102 (block 1022). The identifier string 244 is visible to the security server 204 but is not visible to the user, as described above and may include one or more backspace or delete entries/characters. The security device 202 transmits the identifier string 244 to the security server 204 using one or more event loggers or applications on the user device 102. After the security device 202 transmits its identifier string 244, the security device 202 generates a security input 242 by first generating a random string 246 (block 1024). The random string 246 is generated based on one or more rules as part of the private key 260 of the security device 202. The security device 202 integrates the user input with the random string 246 to generate a watermark string 248 (block 1026). The security device 202 then transmits the security input 242 including the watermark string 248 to the security server 204 (block 1028). In some embodiments, the identifier string 244 may be integrated with the watermark string and transmitted together or the identifier string 244 or the random string 246 may be omitted.

Procedure 1040 describes actions performed by the security server 204. As described above, the security server 204 receives the identifier string 244, which is validated against approved or known identifier strings 244 (block 1042). If the security server 204 validates the identifier string 244, the security server 204 determines the security input 242 (including the user-input) is acceptable for processing (block 1044). The security server 204 compares the watermark rules (e.g., the public key 332) corresponding to the identifier string 244 to the security input 242 (block 1046). The security server 204 uses the watermark rules to separate or otherwise identify the user-provided input and the security input 242. The security server 204 may also compare the text input identified by the rules to the user-provided input to confirm the watermark rules are correct. For example, the security server 204 determines the watermark rules correspond to the text "HELLO" and also determines the user-provided input included in the received data includes the text "HELLO". If the text does not match, the security server 204 may discard or otherwise delete the text. Also, as shown in FIG. 10, if the identifier string 244 does not match, the security server 204 discards or otherwise deletes the security input 242 (block 1050). The security server 204 may only transmit the user input to the application server 104, as shown in FIG. 10, if both the identifier string 244 matches and the text indicated by the watermark rules matches the user-provided text (block 1048).

Mobile Device Security Embodiment

In some embodiments, the example method, apparatus, and system are configured for securing commercial smartphones. The example method, apparatus, and system include a mobile endpoint device (e.g., a smartcase) that is communicatively coupled to a smartphone using an air-gap wireless protocol such as Bluetooth®, Zigbee, or NFC. The mobile endpoint device uses the Wi-Fi capabilities of a smartphone to transmit data across a network to a secure network or application server. The mobile endpoint device encrypts data before it gets to a smartphone to prevent interaction with, or reading of the data by, a malicious application. The encrypted data is sent to a proxy server, which is an interface to the secure network or application server. The proxy server decrypts and transmits the data to the intended application server. Since the data is encrypted through its transmission, including on the smartphone, it is virtually impossible for a malicious application to interfere with the data.

The use of the air gap between the mobile endpoint device and the smartphone provides a robust firewall between the smartphone and the mobile endpoint device. The use of the mobile endpoint device and proxy server eliminates the need for security-sensitive devices to have "unhackable", hardened, mobile operating systems and "security baked in at the factory" hardware, which can easily become obsolete in view of the rapid development in commercial operating systems and their system-on-chip hardware circuitry. Accordingly, with the presently disclosed method, apparatus, and system, an enterprise can use any commercial device, taking advantage of its feature sets and popularity, without having to develop their own devices for security purposes. The mobile endpoint device also eliminates security risks from embedded malicious hardware on smartphones (e.g., as supply chains themselves become prone to malicious activity/spying).

Throughout this disclosure, reference is made to utilizing a mobile endpoint device with smartphones. It should be appreciated that the mobile endpoint device may be configured to work with other devices, including any cellphone, personal digital assistant ("PDA"), mobile device, tablet computer, computer, laptop, server, processor, console, gaming system, multimedia receiver, or any other computing device. Further, examples in this disclosure describe user devices and servers performing secure government access transactions. However, the example method, apparatus, and system for securing commercial smartphones disclosed herein can be applied to any type of transaction or controlled usage of resources between a server and a user device including, but not limited to, online purchases of goods or services, point of sale purchases of goods or services (e.g., using NFC), medical applications (e.g., intravenous medication as dispensed by an infusion pump under the control of a computer at a nurses station or medication as delivered to a home address specified in a webpage), manufacturing processes (e.g., remote manufacturing monitoring and control), infrastructure components (e.g., monitoring and control of the flow of electricity, oil, or flow of information in data networks), transmission of information with a social network, or transmission of sensitive and confidential information.

Figure 11:
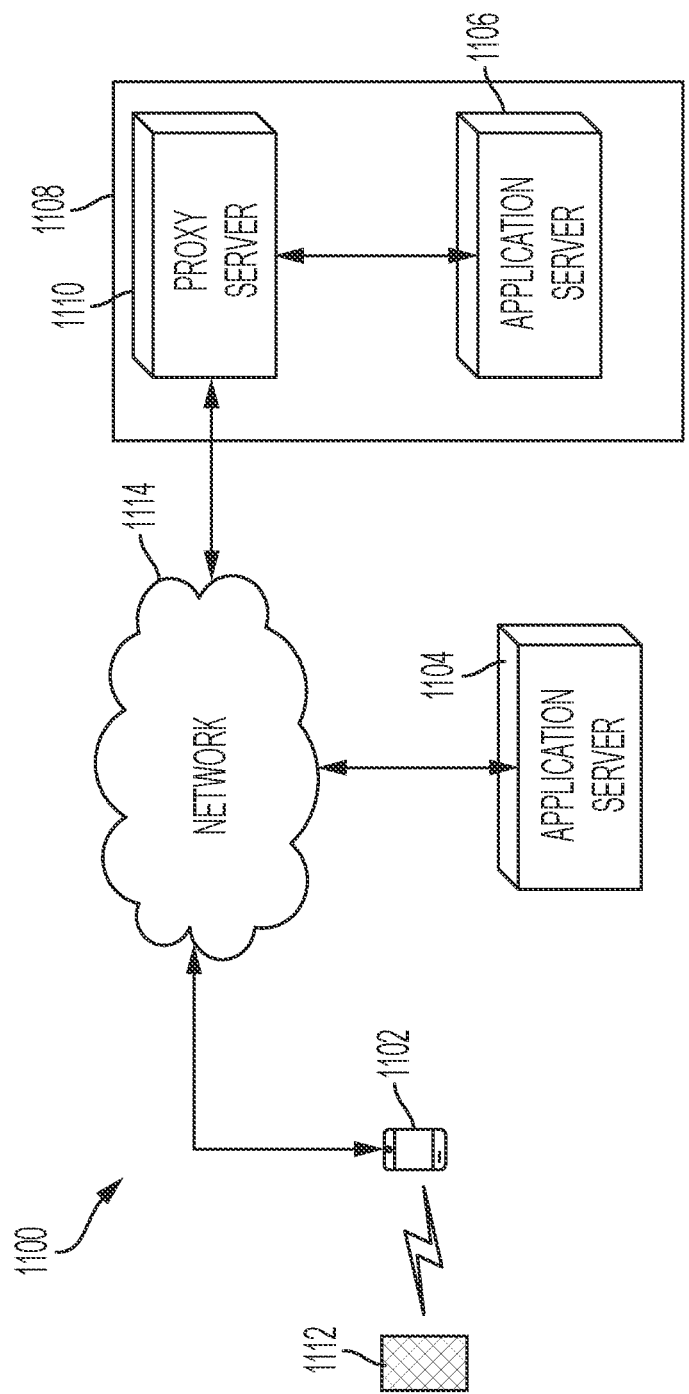
FIG. 11 shows a diagram of an example communication system, according to another example embodiment of the present disclosure.

FIG. 11 shows a diagram of an example communication system 1100, according to an example embodiment of the present disclosure. The system 1100 includes a user device 1102 (e.g., a smartphone) that is communicatively coupled to a network 1114 via a Wi-Fi, Ethernet, cellular, etc. connection. The illustrated system 1100 also includes application servers 1104 and 1106. The application server 1104 is located in an insecure or public network. The application server 1106 is located within a secure network 1108. The secure network 1108 may be a government, enterprise, or other secure network that is generally not available to the public.

The network 1114 can include, for example, the Internet or some other data network, including, but not limited to, any suitable wide area network or local area network. It should be appreciated that any of the devices described herein may be directly connected to each other and/or connected through the network 1114. The network 1114 may also support wireless cellular communication with wireless user devices 1102.

The user devices 1102 access data, services, media content, and any other type of information located on the servers 1104 and 1106. The user devices 1102 may include any type of operating system, processor, and/or memory device. Further, the user devices 1102 may perform any function capable of being performed by a processor. For instance, the user devices 1102 may access, read, and/or write information corresponding to services hosted by the servers 1104 and 1106.

Typically, the servers 1104 and 1106 process one or more of a plurality of files, programs, data structures, databases, and/or web pages in one or more memories for use by the user devices 1102, and/or other servers 1104 or 1106. The servers 1104 and 1106 may provide services accessible to the user devices 1102 or provide a framework for the user devices 1102 to access data stored in the database using one or more APIs. The servers 1104 and 1106 may be configured according to their particular operating system, applications, memory, hardware, etc., and may provide various options for managing the execution of the programs and applications, as well as various administrative tasks. A server 1104 or 1106 may interact via one or more networks with one or more other servers 1104 or 1106, which may be operated independently.

The example servers 1104 and 1106 provide data and services to the user devices 1102. The servers 1104 and 1106 may be managed by one or more service providers, which control the information and types of services offered. These services providers also determine qualifications as to which user devices 1102 are authorized to access the servers 1104 and 1106. The servers 1104 and 1106 can provide, for example, banking services, online retain services, social media content, multimedia services, government services, educational services, etc. Additionally, the servers 1104 and 1106 may provide control to processes within a facility, such as a process control system. In these instances, the servers 1104 and 1106 provide the user devices 1102 access to read, write, or subscribe to data and information associated with specific processes. For example, the server 1106 may provide information and control to the user devices 1102 for an oil refinery or a manufacturing plant. In this example, a user of the user device 1102 can access a server 1106 to view the status of various equipment within the plant or to set controls for the equipment within the plant.

While the servers 1104 and 1106 are shown as individual entities, the servers 1104 and 1106 may be partitioned or distributed within a network. For instance, the server 1104 or 1106 may be implemented within a cloud computing network with different processes and data stored at different servers or processors. Additionally, multiple servers or processors located at different geographic locations may be grouped together. In this instance, network routers determine which user device 1102 connects to which processor within the servers 1104 and 1106.

To provide secure access to the server 1106 via the secure network 1108, the example system 1100 of FIG. 11 includes a proxy server 1110 and a mobile endpoint device 1112. The example proxy server 1110 is configured as an interface or gateway device to the secure network 1108 and the corresponding application server 1106. The proxy server 1110 may be Linux-based and programmed in the C-programming language. The proxy server 1110 may be deployed as a virtual machine for cloud-based applications or as a hardware appliance. In some embodiments, the proxy server 1110 may be configured as secure sockets layer ("SSL") or a transport layer security ("TLS") terminating endpoint for networks where a secure network is not available or present. In some embodiments, the proxy server 1110 may be included with the application server 1106.

In various examples, the mobile endpoint device 1112 is configured as a thin-device that may be secured to a user device 1102. For instance, the mobile endpoint device 1112 may be configured as a case that form fits to a smartphone. In some examples of such instances, a display 1230 (FIG. 12) and an input device 1240 (FIG. 12) of the mobile endpoint device may be configured on the inside of the case such that they face the back of the user device 1102 when the user device 1102 is in the case. In such examples, a user must remove the user device 1102 from the case in order to access the display 1230 and the input device 1240 of the mobile endpoint device 1112. As such, the display 1230 and the input device 1240 are hidden from view when the mobile endpoint device 1112 is not in use. Users may appreciate that the outside of the case has an appearance similar to conventional smartphone cases in such examples.

In other examples of the instances in which the mobile endpoint device 1112 is configured as a smartphone case, the display 1230 and input device 1240 may be configured on the outside of the case such that they are visible when the user device 1102 is in the case. Accordingly, when the case is secured to the user device 1102, a user may view the screen of the user device 1102 by holding the user device 1102 one way, and may flip the user device 1102 to view the display 1230 of the mobile endpoint device 1112 configured in the case. Users may appreciate the convenience of being able to use the mobile endpoint device 1112 with the user device 1102 in the case in such examples. In either of the above-described examples, the mobile endpoint device 1112 is configured to provide a look-and-feel, style, and size of commercial smartphone cases, and thus is suitable for convenient handling and portability when in use with a user device 1102.

In other examples, the mobile endpoint device 1112 is not adapted to be secured to the user device 1102. Instead, in such examples, a user device 1102 may be brought in proximity to the mobile endpoint device 1112 when a user desires to securely transmit data from the user device 1102 with the mobile endpoint device 1112. Therefore, in such examples, the mobile endpoint device 1112 may be any suitable shape and size to allow a user to input data using the mobile endpoint device 1112.

In some examples, the proxy server 1110 receives data from the application server 1106 that is destined for the mobile endpoint device 1112 via the user device 1102. In such examples, the proxy server 1110 encrypts the data, using AES, Suite B, or other encryption protocol in addition to any encryption provided by an SSL. The proxy server 1110 also formats the data into a protocol suited for the mobile endpoint device 1112 as well as for air-gap transmission. The proxy server 1110 then transmits the encrypted formatted data to the user device 1102 (e.g., over the network 1114). After receiving the encrypted formatted data, the user device 1102 determines that the data is for the mobile endpoint device 1112 and accordingly transmits the data to the mobile endpoint device 1112 over the air gap. The mobile endpoint device 1112 decrypts the data and displays it on the display 1250 (FIG. 12) of the mobile endpoint device 1112.

In other examples, a user inputs data (e.g., an email) into the mobile endpoint device 1112. The mobile endpoint device 1112 then encrypts the input data, formats the data for transmission over an air gap, and transmits it to the user device 1102. In some instances, the user device 1102 may format the encrypted data for transmission over a Wi-Fi or cellular network, and then may transmit the encrypted, formatted data to the proxy server 1110. The proxy server 1110 decrypts the encrypted data and transmits it to the application server 1106, at which point the application server 1106 processes the data (e.g., transmits the email to the intended recipient). In some instances, the application server 1106 may then transmit an encrypted response to the mobile endpoint device 1112 via the user device 1102 as described above.

The encryption of the data by the mobile endpoint device 1112 or the proxy server 1110 ensures that the data cannot be deciphered by any entity at the user device 1102, including malicious applications, or anything between the user device 1102 and the proxy server 1110. The mobile endpoint device 1112 accordingly provides a secure endpoint before the user device 1102 that enables secure communications with a secure network 1108. Additionally, for applications that are non-secure, the user can use the user device 1102, instead of the mobile endpoint device 1112, to transmit the data. For instance, a user may send an email using the user device 1102 to the application server 1104 if the user is less concerned about the security risks of sending the email over an insecure or public network. The user does not have to send the email with the mobile endpoint device 1112 when it is being used with the user device 1102. Therefore, the mobile endpoint device 1112 is accordingly a secondary communication device (e.g., a feature-lite device) for secure communications that uses the cellular or Wi-Fi connectivity of the user device 1102 for network communications.

In some embodiments, the operations performed by the proxy server 1112 may be combined with operations performed by the security server 204 discussed above in connection with FIGS. 2 to 10. In these embodiments, the proxy server 1112 may also identify one or more security inputs included within text typed by a user to validate the user's inputs. The proxy server 1112 may decrypt the text prior to validating the user's text.

Figure 12:
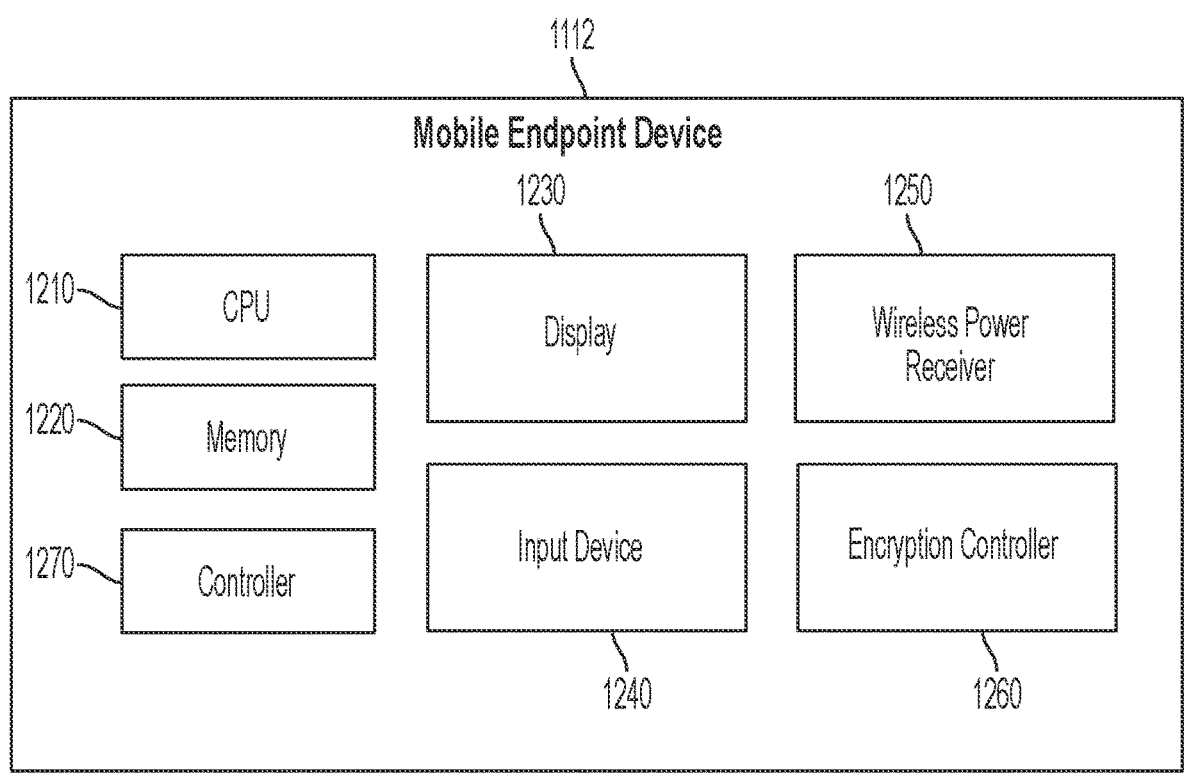
FIG. 12 shows a diagram of an example mobile endpoint device, according to an aspect of the present disclosure.

FIG. 12 shows a diagram of an example mobile endpoint device 1112, according to an aspect of the present disclosure. The mobile endpoint device 1112 includes different components that are representative of computational processes, routines, and/or algorithms. In some embodiments, the computational processes, routines, and/or algorithms may be specified in one or more instructions stored on a computer readable medium that, when executed by a processor of the mobile endpoint device 1112, cause the mobile endpoint device 1112 to perform the operations discussed below. For example, all or part of the computational processes, routines, and/or algorithms may be implemented by a CPU 1210 and a memory device 1220. In other examples, the components of the mobile endpoint device 1112 may be combined, rearranged, removed, or provided on a separate device, microprocessor, chip-set, or hardware.

In various examples, the mobile endpoint device 1112 includes a display 1230, an input device 1240, a wireless power receiver 1250, an encryption controller 1260, and a controller 1270. The display 1230 may include, for example, an e-ink or liquid crystal display for displaying text and graphics. In some instances, the display 1230 may include a touchscreen. The input device 1240 may be any suitable mechanism for entering information, for example, a keyboard, track ball, input buttons, etc. such that a user may enter text, navigational commands, etc. In some instances, the input device 1240 may be separate from the display 1230 and may communicate with the display 1230. In other instances, the display 1230 may include the input device 1240, such as when the display device 1230 is a touchscreen and a user may enter information directly on the display 1230. The controller 1270 is configured to process data to present on the display 1230. Such data may be received, for example, from the application server 1106, the proxy server 1110, the input device 1240, and/or may be accessed internally, such as menus, applications, and graphical user interfaces.

In various examples, the wireless power receiver 1250 is configured to communicate with the user device 1102 over an air gap between approximately 0.1 mm to 2 feet. The wireless power receiver 1250 may be configured for at least one of a Bluetooth® format, an NFC wireless protocol, an RF wireless protocol, a Zigbee protocol, or any other wireless protocol for transmitting power wirelessly over short distances. Generally, the wireless protocol should be supported by the user device 1102 without modification. In some embodiments, the wireless power receiver 1250 may include an energy harvesting module or battery, to enable the wireless connection to charge a battery.

The encryption controller 1260 is configured to encrypt and decrypt data. For instance, the encryption controller 1260 may include one or more private keys that are paired with public keys stored at the proxy server 1110 such that the proxy server 1110 may decrypt data that the encryption controller 1260 has encrypted, and the encryption controller 1260 may decrypt data that the proxy server 1110 has encrypted. The encryption controller 1260 is programmed in various examples to receive data from the proxy server 1110 via the user device 1270 and change the data format from a format used for transmission over a small air gap (e.g., a Bluetooth® format, an NFC protocol, an RF protocol, a Zigbee protocol, or any other protocol that enables wireless data transmission over an air gap between 0.1 mm and 20 feet) to a format for processing by the controller 1270. Additionally or alternatively, the encryption controller 1260 is programmed in various examples to format data from the controller 1270 for transmission over an air gap to the user device 1102.

In some examples, the encryption controller 1260 is configured to create a virtual private network ("VPN") or other secure tunnel to the proxy server 1110. In such examples, the tunnel passes through the user device 1102, preventing any application on the user device 1102 from reading or otherwise interfering with the communications from the mobile endpoint device 1112. In some instances, the mobile endpoint device 1112 may provide the VPN or secure tunnel for a session initiated by a user, and close the tunnel after a certain time period or when the user ends the session.

In various examples, the controller 1270 may include a network address and/or hardware address (e.g., a MAC address). If a hardware address is provided, the mobile endpoint device 1112 may use a network address of the user device 1102, where the user device 1102 operates as a router to forward data received from the application server 1106 to the controller 1270 via a wireless air gap transceiver. In this embodiment, the user device 1102 assigns or associates the network address or hardware address of the mobile endpoint device 1112 with an interface for a wireless transceiver for the air-gap transmission. In some examples, the controller 1270 may manage secure sessions and have corresponding session identifiers for each of the secure application servers 1106 accessed by the mobile endpoint device 1112. Communications to the application server 1106, via the proxy server 1110, from the controller 1270 may include the network address or hardware address. Accordingly, the application server 1106 uses the network or hardware address when responding for providing web-content to the mobile endpoint device 1112.

The configuration of the controller 1270 and the encryption controller 1260 prevents public domain servers, such as the application server 1104, from transmitting information through the user device 1102 to the mobile endpoint device 1112. For instance, at least the encryption controller 1260 is configured to block malicious applications that are enabled to tunnel to the mobile endpoint device 1112 because the transmissions from the malicious application will not be in the proper formatting for air gap transmission and will not have the designated encryption scheme. Thus, only data from the proxy server 1110, which is provided in the proper format and encryption, can be processed and passed by the encryption controller 1260 to the controller 1270.

Because the user device 1102 is relatively complex regarding incorporated technology and is used to access many unsecure public servers (and operate downloaded applications), the user device 1102 has a large attack surface and is exposed to many vulnerabilities, including supply chain vulnerabilities introduced at the time of manufacture.

In contrast, the mobile endpoint device 1112 is configured for security and does not permit a user to access unintended servers, install mobile applications, and/or use mobile cameras. In other words, the mobile endpoint device 1112 does not include unnecessary hardware and firmware, only the hardware and software needed to communicate and interact with the application server 1106 at the secure network 1108. Accordingly, the separation between the mobile endpoint device 1112 and the user device 1102 reduces the need to provide more robust security on the user device 1102 to access the secure network 1108. In other words, an end user may use an off-the-shelf smartphone with the mobile endpoint device 1112 to access the secure network 1108 and does not need to use a smartphone with customized security features.

Figure 13:
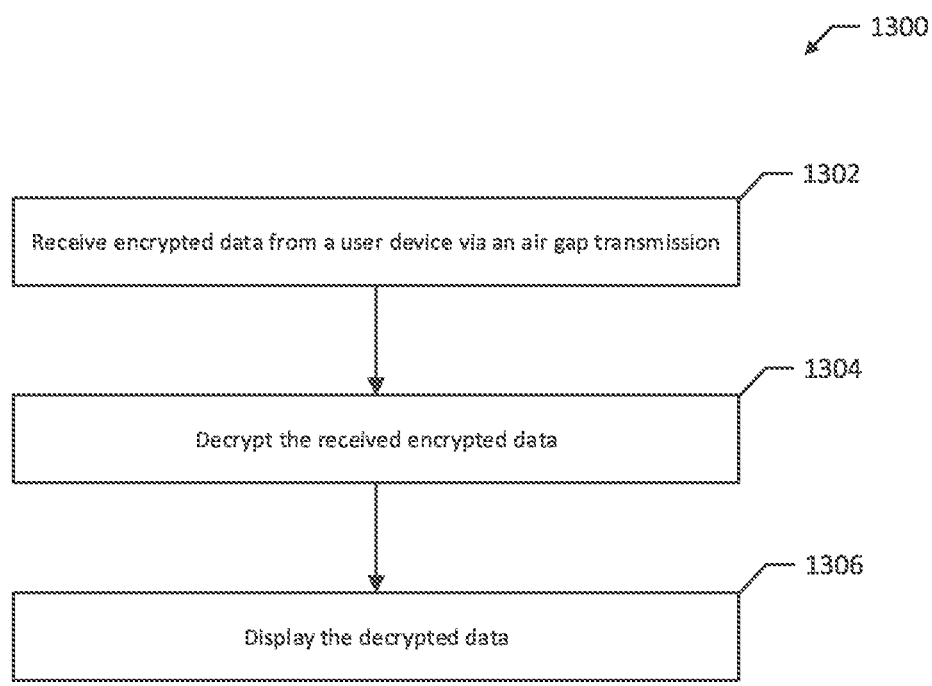
FIG. 13 shows a diagram of an example method for securely receiving and displaying data, according to an aspect of the present disclosure.

FIG. 13 shows a diagram of an example method 1300 for decrypting received data at the mobile endpoint device 1112, according to an aspect of the present disclosure. The method 1300 may be implemented on a computer system, such as the mobile endpoint device 1112. For example, the method 1300 may be implemented by the display 1230, the input device 1240, the wireless power receiver 1250, the encryption controller 1260, and/or the controller 1270. The method 1300 may also be implemented by a set of instructions stored on a computer readable medium that, when executed by a processor, cause the processor to perform the method described herein. For example, all or part of the method 1300 may be implemented by the CPU 1210 and the memory device 1220. Although the examples below are described with reference to the flowchart illustrated in FIG. 13, many other methods of performing the acts associated with FIG. 13 may be used. For example, the order of some of the blocks may be changed, certain blocks may be combined with other blocks, one or more of the blocks may be repeated, and some of the blocks described may be optional.

The method 1300 begins at step 1302 when a system (e.g., the mobile endpoint device 1112) receives encrypted data from a user device (e.g., the user device 1102) via an air-gap transmission. For instance, the air-gap transmission may be carried out according to the description herein using, for example, a Bluetooth® format, an NFC protocol, an RF protocol, a Zigbee protocol, or any other protocol that enables wireless data transmission over an air gap between 0.1 mm and 20 feet. A server (e.g., the proxy server 1110) encrypts the data and transmits it to the user device prior to the user device forwarding or transmitting the encrypted data to the mobile end point device 1112. At step 1304, the system decrypts the received encrypted data (e.g., with the encryption controller 1260). At step 1306, the system processes and displays the decrypted data (e.g., on the display 1230).

Figure 14:
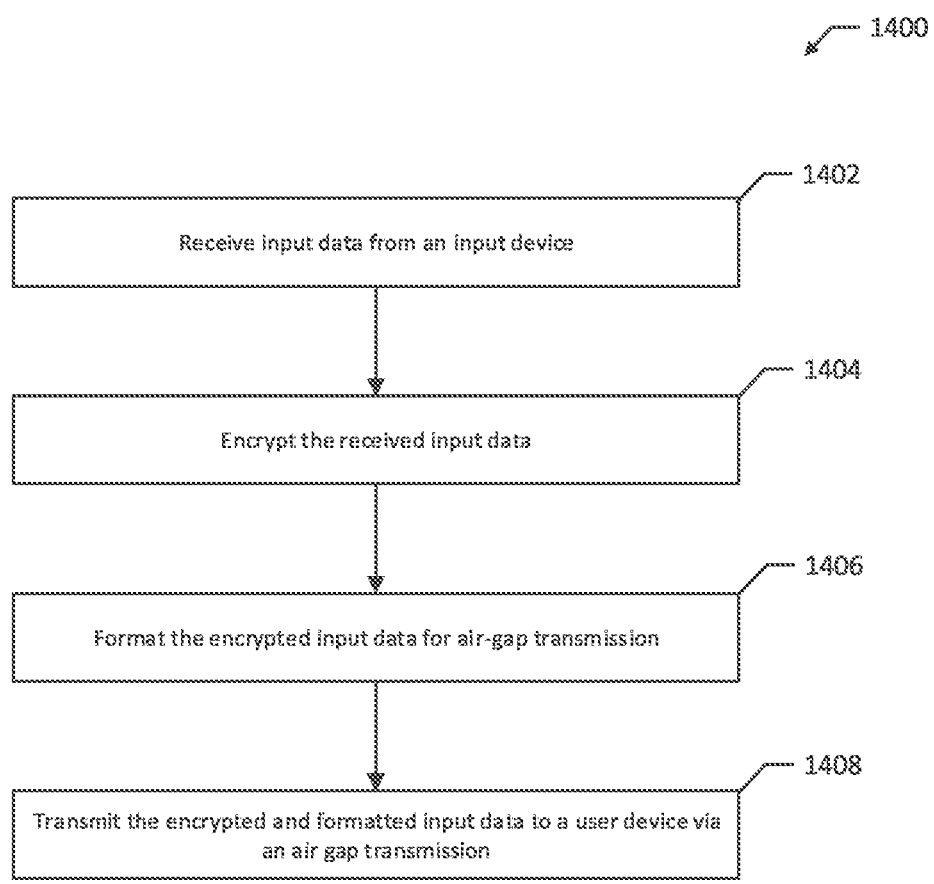
FIG. 14 shows a diagram of an example method for securely sending data, according to an aspect of the present disclosure.

FIG. 14 shows a flow diagram of an example method 1400 to encrypt data at a mobile end point device 1112 for transmission to an application server 1106, according to an aspect of the present disclosure. The method 1400 may be implemented on a computer system, such as the mobile endpoint device 1112. For example, the method 1400 may be implemented by the display 1230, the input device 1240, the wireless power receiver 1250, the encryption controller 1260, and/or the controller 1270. The method 1400 may be implemented by a set of instructions stored on a computer readable medium that, when executed by a processor, cause the processor to perform the method disclosed herein. For example, all or part of the method 1400 may be implemented by the CPU 1210 and the memory device 1220. Although the examples below are described with reference to the flowchart illustrated in FIG. 14, many other methods of performing the acts associated with FIG. 14 may be used. For example, the order of some of the blocks may be changed, certain blocks may be combined with other blocks, one or more of the blocks may be repeated, and some of the blocks described may be optional.

The method 1400 begins at step 1402 when a system (e.g., the mobile endpoint device 1112) receives input data from an input device (e.g., the input device 1240). For example, as described above, the input device may be a physical or touch display keyboard. At step 1404, the system encrypts the received input data (e.g., by the encryption controller 1260). At step 1406, the system formats the encrypted input data (e.g., by the encryption controller 1260) for air-gap transmission. For instance, the air-gap transmission may be carried out using, for example, a Bluetooth® format, an NFC protocol, an RF protocol, a Zigbee protocol, or any other protocol that enables wireless data transmission over an air gap between 0.1 mm and 20 feet. At step 1408, the system transmits the encrypted and formatted input data to a user device (e.g., the user device 1102) via an air-gap transmission. The user device may then format and transmit the encrypted input data over a network to a proxy server (e.g., the proxy server 1110), which decrypts the input data and transmits the input data to another server (e.g., the application server 1106).

Figure 15:
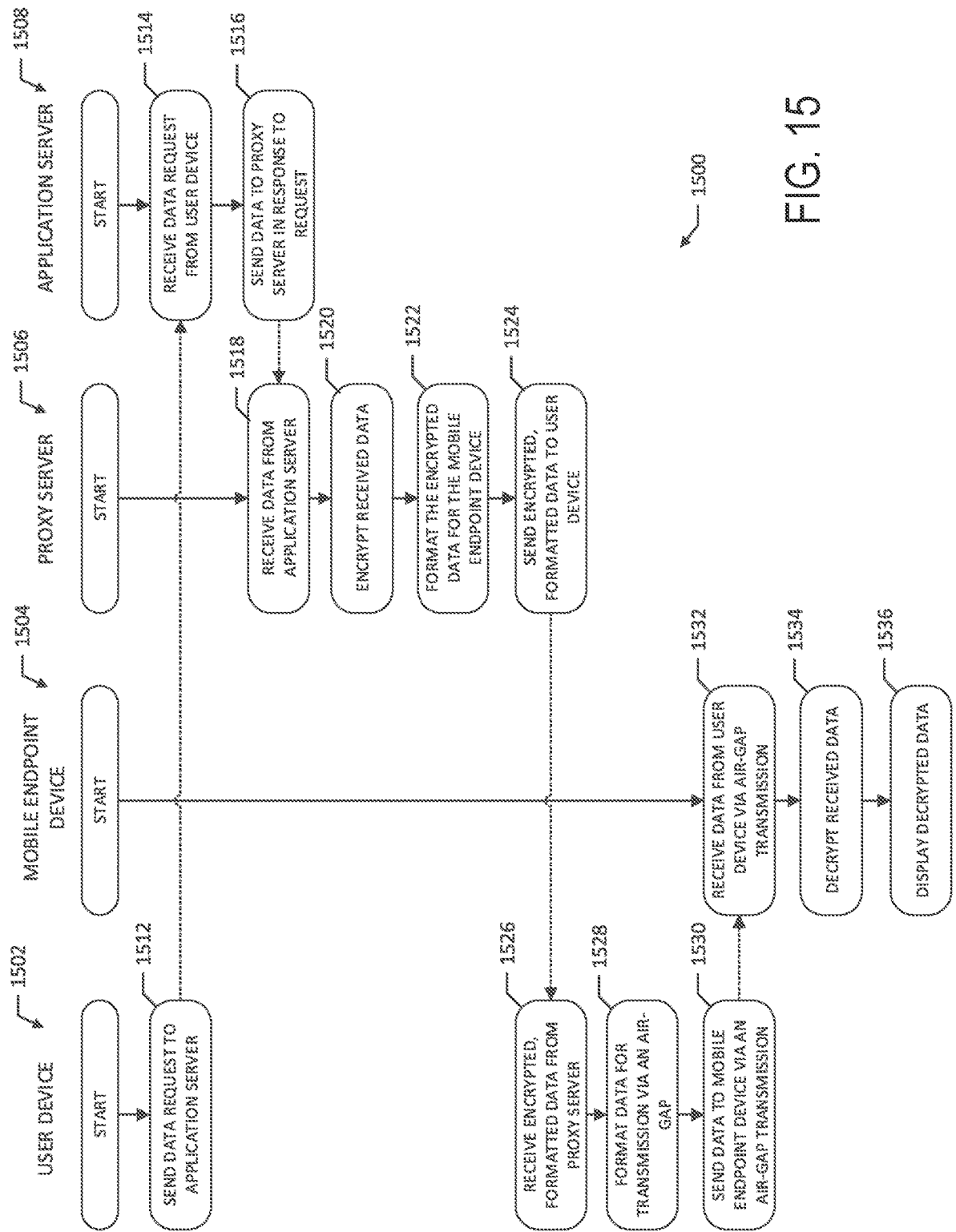
FIG. 15 shows a flow diagram of an example procedure for receiving and displaying data over a secure network, according to an aspect of the present disclosure.

FIG. 15 shows an example procedure 1500 for receiving and displaying data over a secure network, according to an aspect of the present disclosure. The example procedure 1500 includes sub-procedures 1502-1508 for the user device 1102, mobile endpoint device 1112, proxy server 1110, and application server 1106, respectively. Although the examples below are described with reference to the flowchart illustrated in FIG. 15, many other methods of performing the operations associated with FIG. 15 may be used. For example, the order of some of the blocks may be changed, certain blocks may be combined with other blocks, one or more of the blocks may be repeated, and some of the blocks described may be optional. At step 1512, a user device 1102 sends a data request to an application server 1106. For example, the request may be a request for new emails that have arrived on the application server 1106. In other embodiments, the request message may originate at the mobile endpoint device 1112 and be encrypted prior to transmission to the application server 1106 via the user device 1102 (via air gap transmission) and the proxy server 1110 (via the network 1114). At step 1514, the application server 1106 receives the data request from the user device 1102. At step 1516, the application server 1106 sends the requested data to the proxy server 1110 in response to the data request. For instance, the application server 1106 may send all of the emails that have arrived since the last request by the user device 1102.

At step 1518, the proxy server 1110 receives the data from the application server 1106. At step 1520, the proxy server 1110 encrypts the received data. For example, the proxy server 1110 may encrypt the data using AES, Suite B, or other suitable encryption protocol in addition to any encryption provided by an SSL. At step 1522, in some embodiments, the proxy server 1110 formats the encrypted data for the mobile endpoint device 1112. At step 1524, the proxy server sends the encrypted, formatted data to the user device 1102. At step 1526, the user device 1102 receives the encrypted, formatted data. At step 1528, the user device 1102 formats the data for transmission via an air-gap. For example, the air-gap transmission format may be a Bluetooth® format, an NFC protocol, an RF protocol, a Zigbee protocol, or any other protocol that enables wireless data transmission over an air gap between 0.1 mm and 20 feet. At step 1530, the user device 1102 sends the data to the mobile endpoint device 1112 via an air-gap transmission. At step 1532, the mobile endpoint device 1112 receives the data from the user device 1102 via the air-gap transmission. At step 1534, the mobile endpoint device 1112 decrypts the received data. At step 1536, the mobile endpoint device 1112 displays the decrypted data. For instance, the mobile endpoint device 1112 may display an email on the display 1260 for the user to read.

Figure 16:
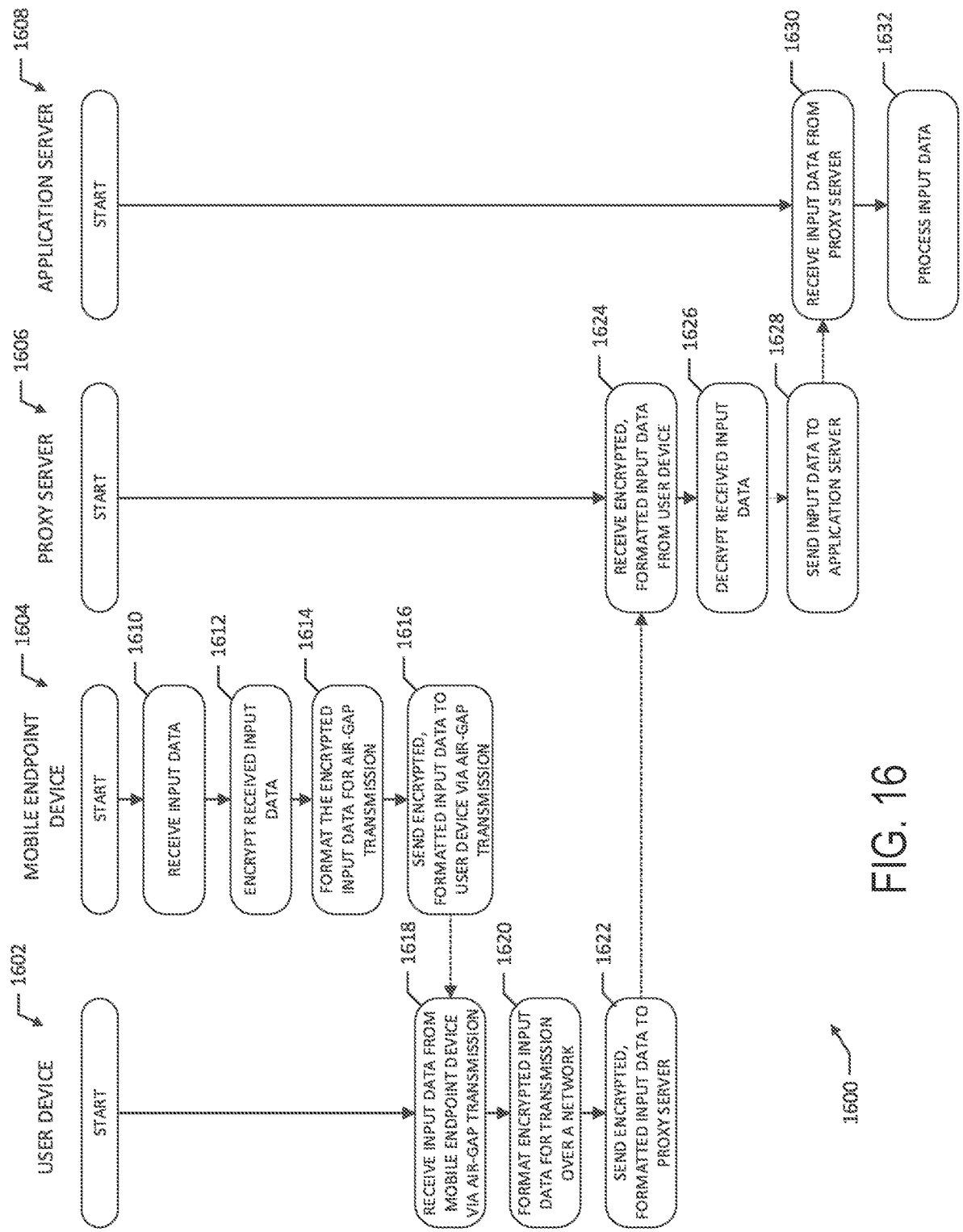
FIG. 16 shows a flow diagram of an example procedure for sending data over a secure network, according to an aspect of the present disclosure.

FIG. 16 shows an example procedure 1600 for sending data over a secure network, according to an aspect of the present disclosure. The example procedure 1600 includes sub-procedures 1602-08 for the user device 1102, mobile endpoint device 1112, proxy server 1110, and application server 1106, respectively. Although the examples below are described with reference to the flowchart illustrated in FIG. 16, many other methods of performing the acts associated with FIG. 16 may be used. For example, the order of some of the blocks may be changed, certain blocks may be combined with other blocks, one or more of the blocks may be repeated, and some of the blocks described may be optional.

At step 1610, the mobile endpoint device 1112 receives input data, for instance, from the input device 1240 of the mobile endpoint device 1112. The input device 1240 may be any suitable mechanism for entering information, for example, a keyboard, track ball, input buttons, etc. such that a user may enter text, navigational commands, etc. The input data may be, for example, the text of an email a user wants to send. At step 1612, the mobile endpoint device 1112 encrypts the received input data. For example, the mobile endpoint device 1112 may encrypt the data using AES, Suite B, or other suitable encryption protocol in addition to any encryption provided by an SSL. The mobile endpoint device 1112 may also specify a network address of the proxy server 1110 and/or the application server 1106 in a destination field. At step 1614, the mobile endpoint device 1112 formats the encrypted input data for air-gap transmission. For example, the air-gap transmission format may be a Bluetooth® format, an NFC protocol, an RF protocol, a Zigbee protocol, or any other protocol that enables wireless data transmission over an air gap between 0.1 mm and 20 feet. At step 1616, the mobile endpoint device 1112 transmits the encrypted, formatted input data to the user device 1102 via an air-gap transmission.

At step 1618, the user device 1102 receives the encrypted, formatted input data from the mobile endpoint device 1112 via the air-gap transmission. At step 1620, the user device 1102 formats the encrypted input data for transmission over the network 1114. For example, the encrypted input data may be formatted for transmission over a Wi-Fi or cellular network. At step 1622, the user device 1102 sends the encrypted, formatted input data to the proxy server 1110 over the network 1114. At step 1624, the proxy server 1110 receives the encrypted input data from the user device 1102. At step 1626, the proxy server 1110 decrypts the encrypted input data and determines that the data is to be transmitted to the application server 1106. At step 1628, the proxy server 1110 sends the decrypted input data to the application server 1106. At step 1630, the application server 1106 receives the input data from the proxy server 1110. At step 1632, the application server 1106 processes the input data 1632. For example, the application server 1106 may send the email to its intended recipients.

Database Security Embodiment

The present disclosure further includes an embodiment in which a method, apparatus, and system are configured to provide database security. In particular, the presently disclosed example method, apparatus, and system are configured to transform or polymorph database requests from an application server to a database in order to help prevent malicious applications from accessing the database. The database requests are transformed or polymorphed such that legitimate requests may be performed at the database as intended, but requests from malicious applications become indecipherable and thus cannot be performed. Accordingly, the presently disclosed example method, apparatus, and system helps prevent database attacks or incursions, and balances front-end web application usability with the need to protect back-end databases from attacks (e.g., injection attacks).

The following disclosure references Structured Query Language ("SQL") as a database language used in a number of examples. The presently disclosed method, apparatus, and system can, however, be applied to any type of database transaction or controlled usage of resources between a server and user device, including, but not limited to, banking transactions, online purchases of goods or services, point of sale purchases of goods or services (e.g., using NFC), medical applications (e.g., intravenous medication as dispensed by an infusion pump under the control of a computer at a nurses station or medication as delivered to a home address specified in a webpage), manufacturing processes (e.g., remote manufacturing monitoring and control), infrastructure components (e.g., monitoring and control of the flow of electricity, oil, or flow of information in data networks), transmission of information with a social network, or transmission of sensitive and confidential information.

In general, conventional web applications balance usability (e.g., enabling a user to meet goals of an assigned task in a powerful and convenient manner) versus security (e.g., the fewer the capabilities and resources made available to the user the better). An important example of the need to balance these opposing requirements (i.e., usability versus security) involves the use of SQL databases. To access a SQL database, an end user, with a web application on a device (e.g., smartphone, laptop, tablet, etc.), connects to a web application server, which in turn communicates with one or more back-end databases. The databases store a variety of information relevant to the web application, such as username/password combinations, user account data, and sensitive data to which the end user has access permissions.

End users may access/modify the information stored on the databases by making entries into webpage forms (e.g., login forms or search forms). In response to end user entries, the web application server sends a command to a database. Many relational databases use the SQL command language, and thus the commands sent to the databases often use SQL. The database responds to the request from the web application server, and the web application server responds to the web application, which then responds to the end user.

The more control an end user has over interactions with the database, the more empowered the end user is to achieve goals and meet task objectives. However, providing end users more access to a database exposes the database to attacks. In database security, not all database "users" are legitimate and trustworthy, and not all information crossing from "userspace" into the executable code regions of the database are legitimate, honest database requests. Rather, in some instances, a malicious actor, such as a malicious application, may send attack scripts disguised as legitimate database requests. For example, SQL injection attacks are frequent and may have damaging effects on a database.

A database security manager may utilize specific programming tactics to reduce a web application's vulnerability to SQL injection attacks. For example, such programming may include character blacklists or whitelists to filter and sanitize user input into web forms. However, security processing in the form of such programming can become a performance bottleneck on a system. Additionally, relying entirely on programming tactics to ensure web service security and data protection in connection with databases is often not an adequate approach. For instance, web applications are often the work of many different programmers over long periods of time, and thus programming tactics may not translate from one programmer to the next. Further, it can be prohibitively costly to retrofit existing web applications that have known vulnerabilities.

Conventional systems attempt to block injection attacks to databases through filtering, profiling, pen-testing, and sandboxing. Many databases feature tens of columns, boolean operators, and logical groupings all on top of a rich SQL syntax. Therefore, potential legitimate query structures can number in the trillions of trillions, without including the complexity of the query search strings themselves. A database security layer has the challenge to safely allow an end user to access as many of the queries as possible without significantly delaying execution of the query.

Filtering and profiling both work by limiting the flexibility of the query structures allowed (e.g., reducing their number) and also reducing the allowed complexity of the search strings. In this regard these approaches are, by design, diametrically opposed to usability. To enforce query restrictions, the filtering and profiling technologies resort to computation. As noted, the query space is large. The computations may involve applying a canned set of rules or rules suggested by a machine learning algorithm. In either case, much computation is involved to compare a query against a large list of rules for compliance. On top of the CPU cycles and time delay, the restricted (but still numerically large) ruleset itself may still contain a certain number of undesirable queries.

Penetration testing generally can locate some attacks, but one can only methodically test the known theoretical attacks. One might try "fuzzing" to test randomly generated queries, but the query space is overwhelmingly large. Additionally, while it may be helpful to check for known flaws in a system, malicious applications are often the first to discover new vulnerabilities. Thus, a malicious application may be actively exploiting an unknown vulnerability while the known vulnerabilities are being checked.

Sandboxing has been an effective database security tactic for many years. However, now that the technique has become widely known, malicious actors may fully realize that their code is about to enter a sandbox environment and can turn their attention to attacking the sandbox. In any case, once a malicious actor discovers a new vulnerability, the malicious actor may access the entire system until the system operators discover and address the vulnerability.

Accordingly, the presently disclosed method, apparatus, and system provides database security by interfacing with existing web services to include "zero-day" plug-ins to application logic. In other words, the presently disclosed method, apparatus, and system are able to help prevent a database from processing malicious attack requests even if a malicious actor is exploiting a yet unknown vulnerability.

The presently disclosed method, apparatus, and system accomplish the above advantages by transforming or polymorphing all database requests, legitimate and malicious, in a way such that legitimate requests are still performed as intended but attack scripts are rendered indecipherable. The attack scripts accordingly are not executed because they cannot be read. The logical substitutions resulting from the transforming or polymorphing of database requests are not visible to an end user, and thus the presently disclosed method, apparatus, and system does not change the user experience of various web applications for end users.

Figure 17:
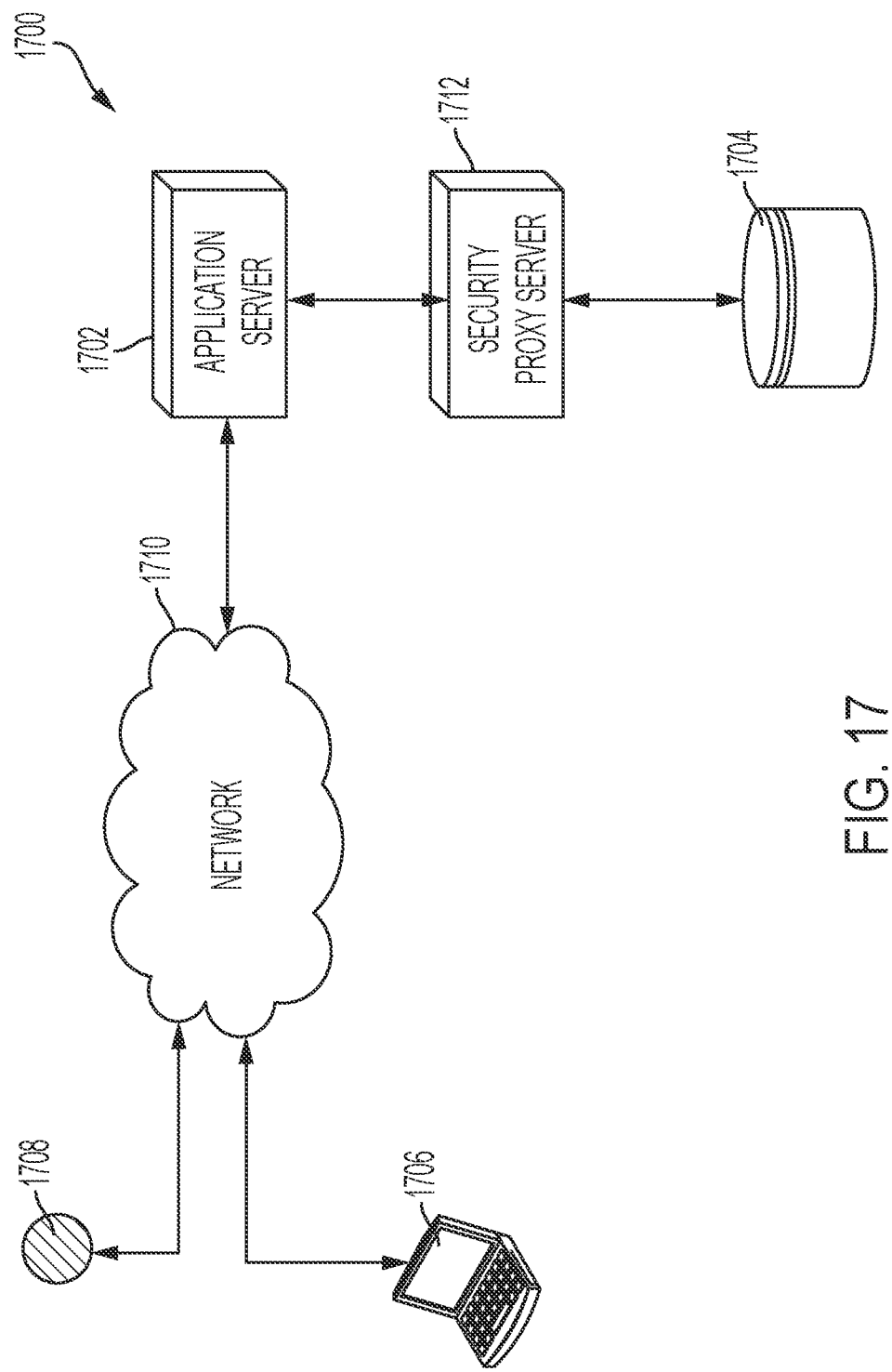
FIG. 17 shows a diagram of an example database system, according to an aspect of the present disclosure.

FIG. 17 shows a diagram of an example database system 1700, according to an aspect of the present disclosure. The example system 1700 includes at least one application server 1702 that provides access to a database 1704. One or more user devices 1706 may connect to the application server 1702 via a network 1710. In addition, one or more malicious applications 1708 may connect to the application server 1702 via the network 1710.

The network 1710 can include, for example the Internet or some other data network, including, but not limited to, any suitable wide area network, cellular network, or local area network. It should be appreciated that any of the user devices 1706 described herein may be directly connected to each other and/or connected through the network 1710. The network 1710 may also support wireless communication with wireless user devices 1706. The user devices 1706 access data, services, media content, and any other type of information/data stored at the database 1704. The user devices 1706 may include any type of operating system and perform any function capable of being performed by a processor. For instance, the user devices 1706 may access, read, and/or write information corresponding to services hosted by the application server 1702 and stored in the database 1704.

Typically, the application server 1702 processes one or more of a plurality of files, programs, data structures, databases, and/or web pages in one or more memories for use by the user devices 1706, and/or other servers. The application server 1702 may provide services accessible to the user devices 1706 or provide a framework for the user devices 1706 to access data stored in the database 1704. The application server 1702 may be configured according to the user devices' 1706 particular operating system, applications, memory, hardware, etc., and may provide various options for managing the execution of the programs and applications, as well as various administrative tasks. An application server 1702 may interact via one or more networks with one or more other servers, which may be operated independently. The application server 1702 may convert database requests received from a user device 1706 (e.g., user-provided search parameters) into machine-to-machine message(s) that the database 1704 may receive for performing search queries.

The example application server 1702 may provide data and services to the user devices 1706. The application server 1702 may be managed by one or more service providers, which control the information and types of services offered. These services providers also determine qualifications as to which user devices 1706 are authorized to access the application server 1702. The application server 1702 can provide, for example, banking services, online retain services, social media content, multimedia services, government services, educational services, etc. Additionally, the application server 1702 may provide control to processes within a facility, such as a process control system. In these instances, the application server 1702 provides the user devices 1706 access to read, write, or subscribe to data and information associated with specific processes. For example, the application server 1702 may provide information and control to the user devices 1706 for an oil refinery or a manufacturing plant. In this example, a user of a user device 1706 can access the application server 1702 to view the status of various equipment within the plant or to set controls for the equipment within the plant.

While the application server 1702 is shown as an individual entity, the application server 1702 may be partitioned or distributed within a network. For instance, the application server 1702 may be implemented within a cloud computing network with different processes and data stored at different servers or processors. Additionally, multiple servers or processors located at different geographic locations may be grouped together. In this instance, network routers determine which user device 1706 connects to which processor within the application server 1702.

The example system 1700 also includes a security proxy server 1712 located between the application server 1702 and the database 1704. The security proxy server 1712 is configured to prevent database injection attacks by operating as an interface between machine-to-machine communications among the application server 1702 and the database 1704. In various instances, malicious applications 1708 may conduct injection attacks by taking advantage of database 1704 syntax flexibility in order to cause the database 1704 to execute instructions that are not intended by the application server 1702. For example, malicious applications 1708 may be programmed based on the reliable expectation that the format of database queries will be consistent with the rules of HyperText Transfer Protocol ("HTTP"), GETS, and POSTS, and consistent with a web form's formatting as presented to a user. From that expectation, it becomes relatively easy for malicious actors to construct scripted injection attacks that a database 1704 will execute regardless of the fact that the requests are not legitimate. Accordingly, the security proxy server 1712 is programmed to utilize the database's 1704 syntax flexibility to prevent malicious applications 1708 from accessing the database 1704 by rendering scripted injection attacks indecipherable.

Figure 18:
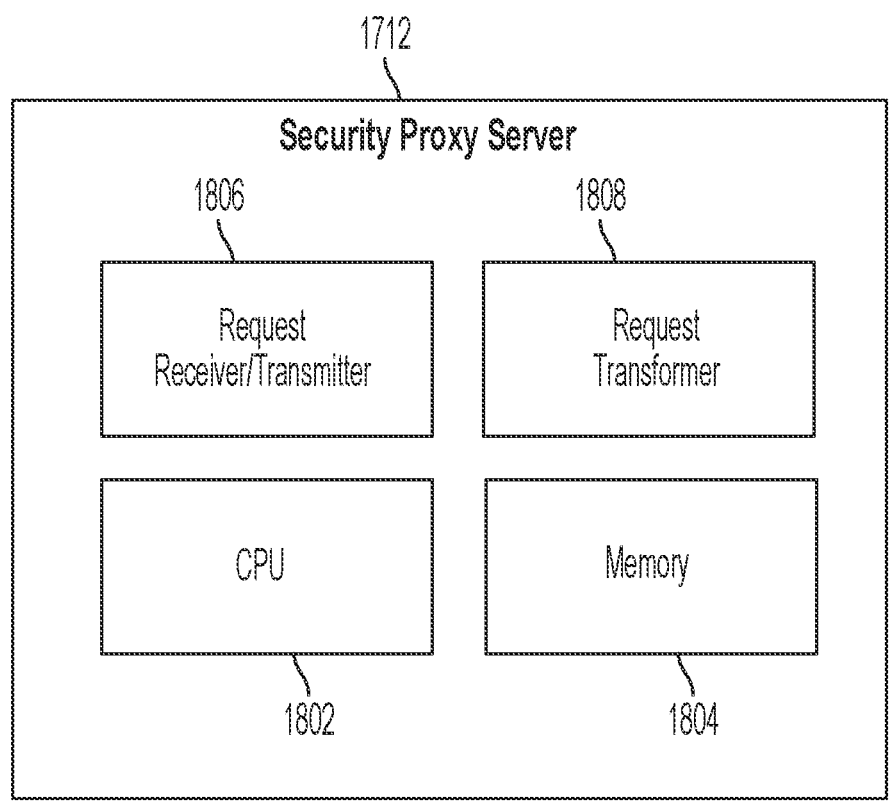
FIG. 18 shows an example diagram of a security proxy server, according to an aspect of the present disclosure.

FIG. 18 shows an example diagram of the security proxy server 1712, according to an aspect of the present disclosure. The security proxy server 1712 includes different components that are representative of computational processes, routines, and/or algorithms. In some embodiments, the computational processes, routines, and/or algorithms may be specified in one or more instructions stored on a computer readable medium that, when executed by a processor of the security proxy server 1712, cause the security proxy server 1712 to perform the operations discussed below. For example, all or part of the computational processes, routines, and/or algorithms may be implemented by a CPU 1802 and a memory device 1804. In other examples, the components of the security proxy server 1712 may be combined, rearranged, removed, or provided on a separate device or server.

The example security proxy server 1712 includes a request receiver/transmitter 1806 and a request transformer 1808. The request receiver/transmitter 1806 may be programmed to receive database requests from the application server 1702, or a malicious application 1708, and to transmit transformed database requests to the database 1704. The request transformer 1808 may be programmed to perform defensive re-writes of the machine-to-machine communications between the application server 1702 and the database 1704 by transforming received database requests. For instance, the request transformer 1808 may be in communication with the memory device 1804, which stores instructions regarding how received database requests are to be transformed. The request transformer 1808 may transform the database requests in accordance with the stored instructions. The database requests are transformed in a manner so that they are still performed as intended by the database 1704 if they are legitimate, but are not performed as intended if the database requests are provided by an automated script conducting an injection attack.

For instance, in at least one example of the present disclosure, the database 1704 includes a language that permits performing searches with query parameters reversed. Thus, a search for "John Smith" and a search for "htimS nhoJ" will produce the same results. Accordingly, in this example, the security proxy server 1712 transforms received database requests by reversing the requests. If the request receiver/transmitter 1806 receives a request from the application server 1702 to perform a search for "John Smith", the request transformer 1808 transforms the request into a request to perform a search for "htimS nhoJ". The request receiver/transmitter 1806 then transmits the transformed request to the database 1704. Because the database 1704 language permits performing searches with reversed query parameters, the same search results are returned as if the initial request to perform a search for "John Smith" was performed.

However, in the case of an attack script from a malicious application 1708, the attack script must be able to perform the same attack when the script is reversed in order for the attack script to operate as intended. For this to be the case, the malicious actor scripting the attack must know in advance that the security proxy server 1712 is going to reverse the script and therefore write it accordingly. If the malicious actor does not know that in advance, then when the attack script is reversed by the security proxy server 1712, the attack script becomes indecipherable and the database 1704 accordingly cannot perform it. In this way, the security proxy server 1712 helps prevent attacks to the database 1704, such as database injection attacks. In addition, the added security is performed without any change to an end user's experience because the transformations conducted by the security proxy server 1712 are not noticeable by an end user.

It should be appreciated that the above example of reversing query parameters is merely an example for explanatory purposes. The request transformer 1808 may perform a multitude of suitable transformations on database requests and the database 1704 may include a corresponding language that permits performing transformed queries to return the same results as performing the untransformed query. Suitable transformations may range from the simple example above of reversing the query to complex rearrangements of characters in a query that may include character additions. In some examples, the request transformer 1808 may be configured to at least one of reverse the order of search terms, change search term labels/types, partition searches of multiple search terms into separate searches and cross-compare the results, inject symbols/characters into the search text, replace symbols/characters into the search text, convert a search string into binary or hexadecimal form, convert alphabetic characters of a search string to SOUNDEX form, etc.

Given the large degree of flexibility of search parameters in a database language, it can be virtually impossible for a malicious application to be designed based on predictions regarding how an attack script will be performed by the database 1704 after the security proxy server 1712 transforms the attack script. Accordingly, malicious actors will not know how to write attack scripts that the database 1704 will perform.

Figure 19:
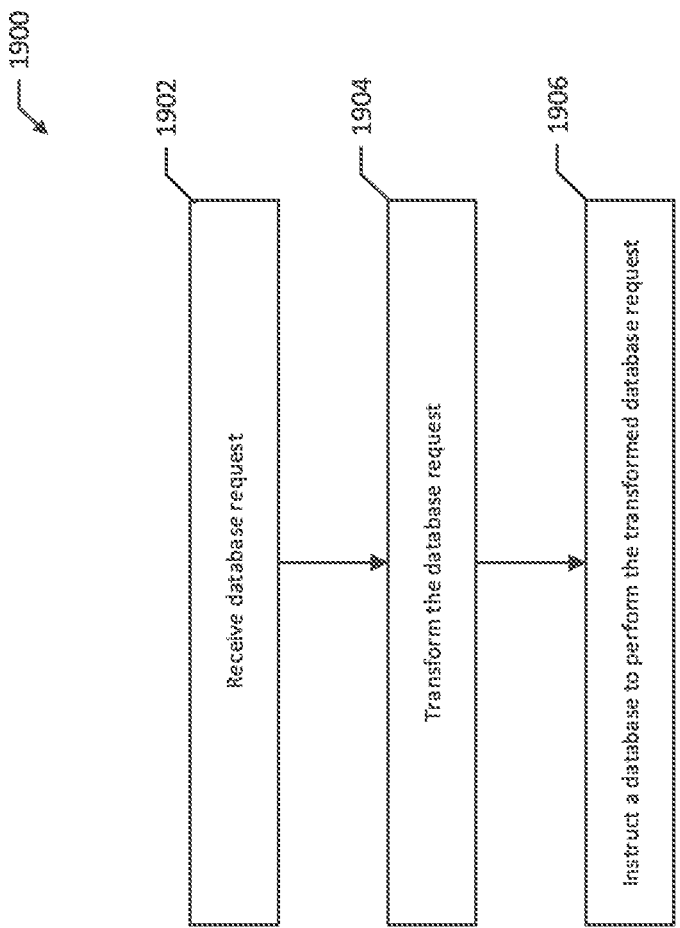
FIG. 19 shows a diagram of an example method for providing database security, according to an aspect of the present disclosure.

FIG. 19 shows a diagram of an example method 1900 to transform a database search query, according to an aspect of the present disclosure. The method 1900 may be implemented on a computer system, such as the security proxy server 1712 of FIG. 17. For example, the method 1900 may be implemented by the request receiver/transmitter 1806 and/or the request transformer 1808. The method 1900 may be implemented by a set of instructions stored on a computer readable medium that, when executed by a processor, cause the processor to perform the method disclosed herein. For example, all or part of the method 1900 may be implemented by the CPU 1802 and the memory device 1804. Although the examples below are described with reference to the flowchart illustrated in FIG. 19, many other methods of performing the acts associated with FIG. 19 may be used. For example, the order of some of the blocks may be changed, certain blocks may be combined with other blocks, one or more of the blocks may be repeated, and some of the blocks described may be optional.

The method 1900 begins at step 1902 when a system (e.g., the security proxy server 1712) receives a database request (e.g., by the request receiver/transmitter 1806). For instance, the database request may be received from an application server (e.g., the application server 1702). In some examples, the database request may include search parameters provided in a search string or a selection from a drop-down menu. The search parameters may be captured in a webpage or other application hosted by the application server 1706. At step 1904, the system transforms the database request (e.g., by the request transformer 1808). For instance, the system may transform the database request according to the preceding disclosure. In various examples, the memory device 1804 may store instructions corresponding to the transformation. At step 1906, the system instructs a database (e.g., the database 1704) to perform the transformed database request. The database returns the same results in response to the transformed database request as the database would return in response to the database request that has not been transformed.

Figure 20:
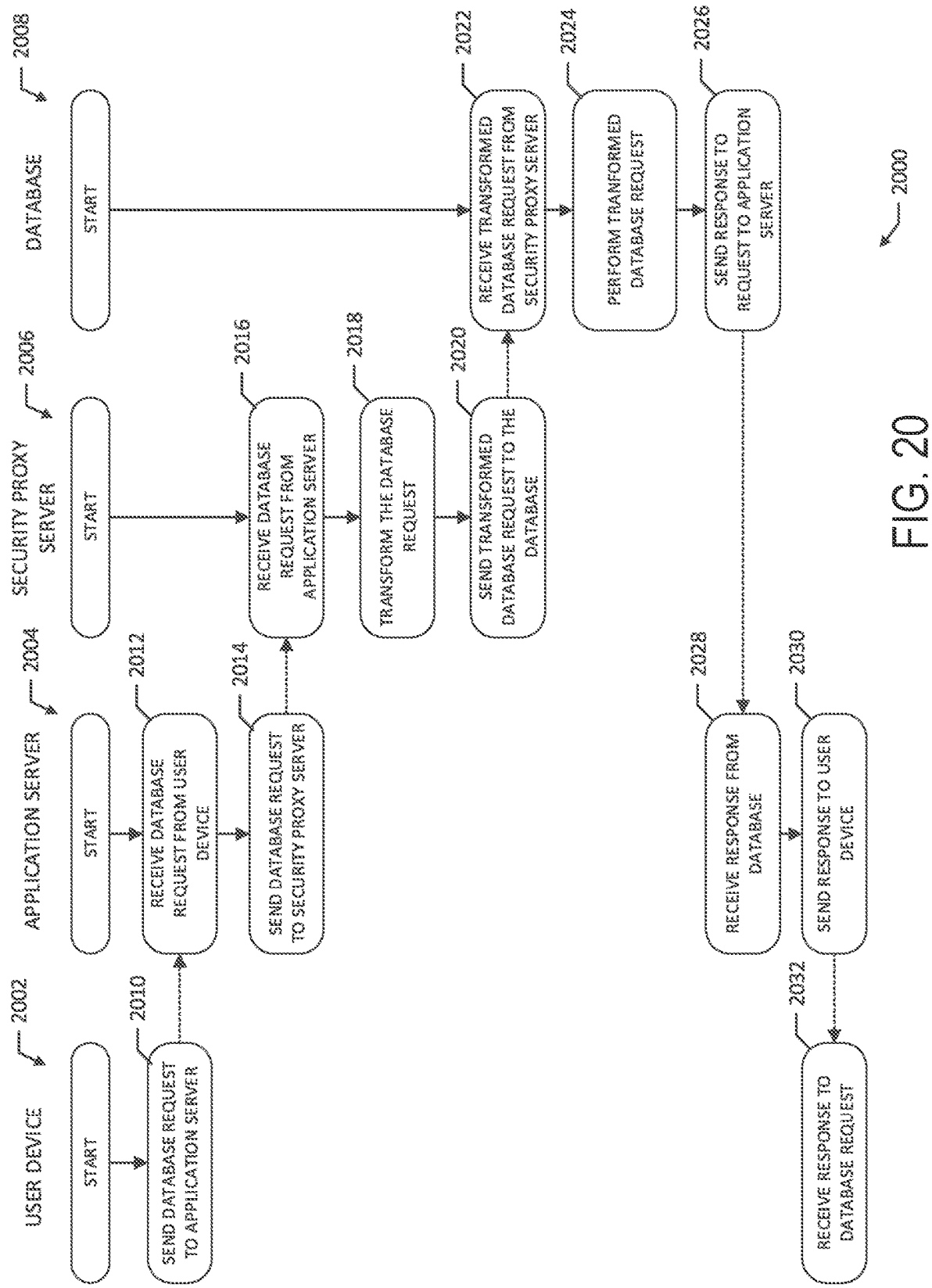
FIG. 20 shows a flow diagram of an example procedure 2000 for securely processing a legitimate database request, according to an aspect of the present disclosure.

FIG. 20 shows a flow diagram of an example procedure 2000 for securely processing a legitimate database request, according to an aspect of the present disclosure. The example procedure 2000 includes sub-procedures 2002-08 for user device 1706, the application server 1702, the security proxy server 1712, and the database 1704, respectively. Although the examples below are described with reference to the flowchart illustrated in FIG. 20, many other methods of performing the acts associated with FIG. 20 may be used. For example, the order of some of the blocks may be changed, certain blocks may be combined with other blocks, one or more of the blocks may be repeated, and some of the blocks described may be optional. At step 2010, a user device 1706 sends a legitimate database request to the application server 1702. For instance, a user may be attempting to login to a web application and the legitimate database request is thus to search for the entered username and password so that the user may be granted access to the web application. At step 2012, the application server 1702 receives the legitimate database request from the user device 1706. At step 2014, the application server 1702 sends the legitimate database request to the security proxy server 1712. In various instances, the application server 1702 converts the legitimate database request into one or more machine-to-machine messages intended for the database 1704 prior to sending the request to the security proxy server 1712.

At step 2016, the security proxy server 1712 receives the legitimate database request from the application server 1702. At step 2018, the security proxy server 1712 transforms the legitimate database request. For instance, the security proxy server 1712 may transform the database request in accordance with the above description. At step 2020, the security proxy server 1712 sends the transformed database request to the database 1704. At step 2022, the database 1704 receives the transformed database request from the security proxy server 1712. At step 2024, the database 1704 performs the transformed database request. For instance, the database 1704 searches for the username and password that the user entered. The database 1704 produces the same result by performing the transformed database request as if the database 1704 had performed the initial legitimate database request received by the application server 1702 from the user device 1706. At step 2026, the database 1704 sends a response corresponding to the result of the request to the application server 1702. For instance, the result may be that the username and corresponding password were located in the database and the response is thus to grant the user access to the web application. In another instance, the result may be that the either the username and/or the password were not located and the response is thus to deny the user access to the web application. The response may also include a prompt to the user to provide a new username and/or password.

At step 2028, the application server 1702 receives the response corresponding to the result of the request from the database 1704. At step 2030, the application server 1702 sends the response to the user device 1706. In some instances, the database 1704 may send the response to the security proxy server 1712, which then sends the response to the application server 1702. At step 2032, the user device 1706 receives the response to the initial legitimate database request. For instance, a web application on the user device 1706 may grant a user access to the web application.

In some instances, the security proxy server 1712 may send both the initial database request and the transformed database request to the database 1704 so that the security proxy server 1712 may compare the results of the two requests. If the results do not match, then the security proxy server 1712 prevents the response to the request from reaching the user device 1706. Instead, the security proxy server 1712 may cause a message to be sent to the user device 1706, such as an error message. If the results do match, the security proxy server 1712, in various instances, does not send the results (e.g., response) from the initial database request and only sends the results to the transformed database request.

Figure 21:
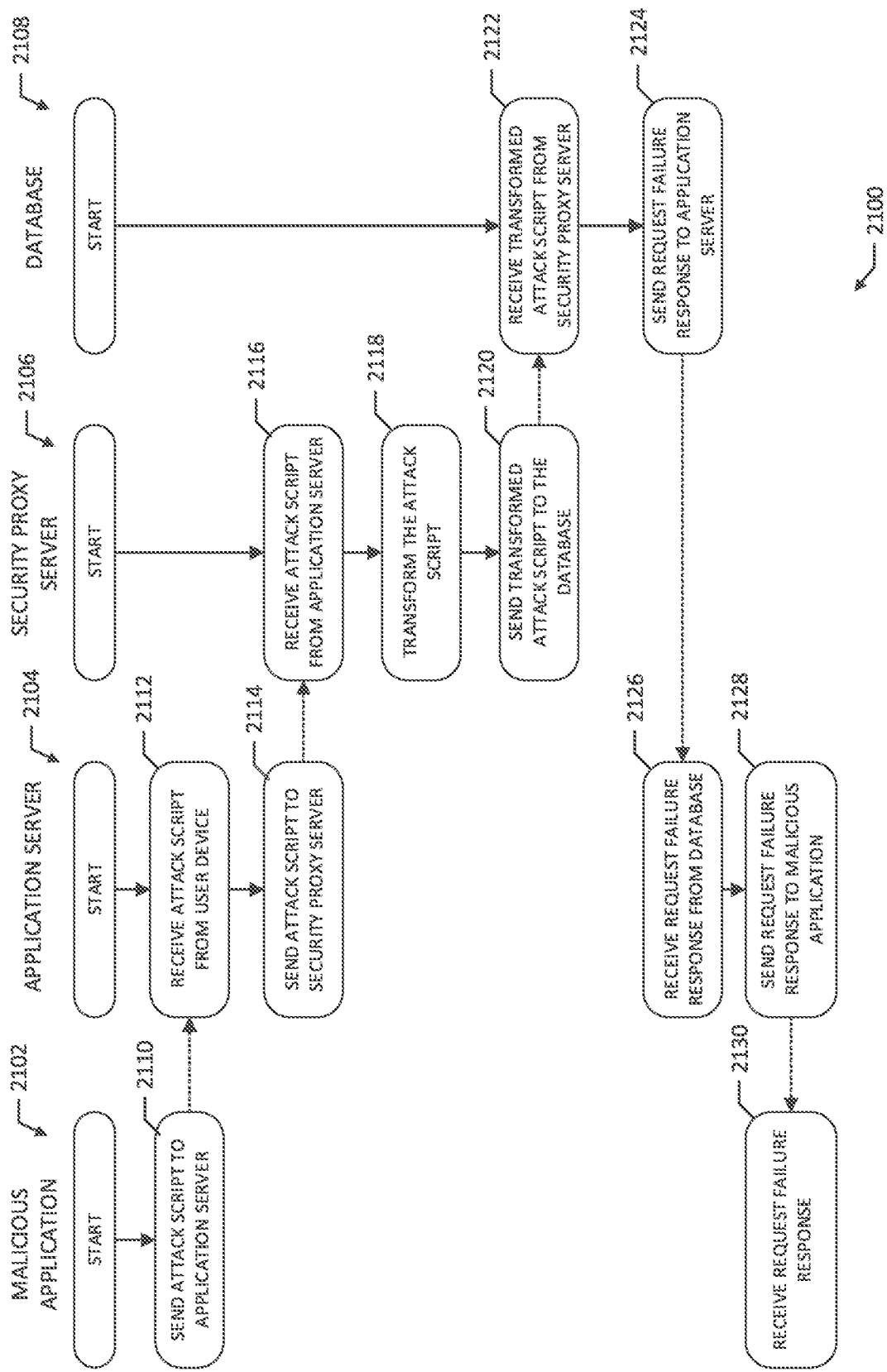
FIG. 21 shows a flow diagram of an example procedure 2100 for preventing a database from performing an attack script, according to an aspect of the present disclosure.

FIG. 21 shows a flow diagram of an example procedure 2100 for preventing a database from performing an attack script, according to an aspect of the present disclosure. The example procedure 2100 includes sub-procedures 2102-08 for user device 1706, the application server 1702, the security proxy server 1712, and the database 1704, respectively. Although the examples below are described with reference to the flowchart illustrated in FIG. 21, many other methods of performing the acts associated with FIG. 21 may be used. For example, the order of some of the blocks may be changed, certain blocks may be combined with other blocks, one or more of the blocks may be repeated, and some of the blocks described may be optional. At step 2110, a malicious application 1708 sends an attack script to the application server 1702. For instance, a malicious actor may be attempting to perform a database injection attack. At step 2112, the application server 1702 receives the attack script from the malicious application 1708. At step 2114, the application server 1702 sends the attack script to the security proxy server 1712. In various instances, the application server 1702 converts the attack script into one or more machine-to-machine messages intended for the database 1704 prior to sending the attack script to the security proxy server 1712.

At step 2116, the security proxy server 1712 receives the attack script from the application server 1702. At step 2118, the security proxy server 1712 transforms the attack script. For instance, the security proxy server 1712 may transform the attack script in accordance with the above description. At step 2120, the security proxy server 1712 sends the transformed attack script to the database 1704. At step 2122, the database 1704 receives the transformed attack script from the security proxy server 1712. Unlike a legitimate database request, however, the database 1704 is unable to perform the transformed attack script because the transformation made the attack script indecipherable. For instance, as described above, an attack script executed in reverse will not perform as intended unless the malicious actor had the knowledge that it would be executed in reverse and scripted it accordingly.

Therefore, at step 2124, the database 1704 sends a request failure response to the application server 1702 indicating that the database 1704 was unable to perform the request. In some instances, the database 1704 may send the request failure response to the security proxy server 1712, which then sends the response to the application server 1702. At step 2126, the application server 1702 receives the request failure response from the database 1704. At step 2128, the application server 1702 sends the request failure response to the malicious application 1708. At step 2130, the malicious application 1708 receives the response to the attack script indicating that the database 1704 was unable to perform the attack script. Additionally or alternatively, the response may cause the application server 1702 to block communications from the malicious application 1708.

Conclusion

Without further elaboration, it is believed that one skilled in the art can use the preceding description to utilize the claimed inventions to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

The invention claimed is:

1. A system for providing security to user-entered inputs, the system comprising:
a security device that is communicatively coupled between an input device and a processor of a user device, the security device being configured to:
receive a string of characters from the input device that correspond to inputs made by a user into a web browser or application on the user device that is in communication with an application server,
add at least one security character to the string of characters to generate a watermark string, and
transmit the watermark string to the user device, causing the user device to transmit the watermark string to a security server that is communicatively coupled between the user device and the application server,
wherein the security device is configured to format the at least one security character such that only the string of characters are displayed in the web browser or the application at the user device, and
wherein the transmission of the watermark string to the security server causes the security server to:
use at least one rule to identify the at least one security character within the watermark string,
compare the at least one security character to one or more security rules,
remove the at least one security character from the watermark string, and
enable the application server to receive the string of characters for processing when the at least one security character matches at least one security rule.

2. The system of claim 1, wherein the security server receives the watermark string from an event listener on the web browser or the application on the user device.

3. The system of claim 1, wherein the at least one security character includes an identifier comprised of one or more identifier characters and a delete key input or a backspace key input after each of the one or more identifier characters such that the one or more delete key inputs or the backspace key inputs cause the identifier not to be displayed at the user device.

4. The system of claim 3, wherein the security server uses the one or more identifier characters for selecting the one or more security rules from among a plurality of security rules and uses at least one of the security characters that do not include identifier characters for comparison to the selected one or more security rules.

5. The system of claim 1, wherein the security device is configured to add the at least one security character by applying at least one watermark rule to a first character of the string of characters entered by the user.

6. The system of claim 1, wherein the security device is configured to add the at least one security character by applying at least one watermark rule to each of the characters of the string of characters entered by the user.

7. The system of claim 1, wherein the security device is configured to add the at least one security character by applying a different watermark rule to each of the characters of the string of characters entered by the user.

8. The system of claim 1, wherein the at least one security character includes a hidden character or a non-displayable character.

9. The system of claim 1, wherein the input device includes a touchscreen device and the security device is connected to a communication bus between the touchscreen device and a processor of the user device.

10. The system of claim 1, wherein the security server prevents the application server from receiving the string of characters if the at least one security character fails to match at least one security rule.

11. The system of claim 10, wherein the security server transmits an alert message to at least one of the application server or the user device indicative of a malicious application when the at least one security character fails to match at least one security rule.

12. The system of claim 1, wherein the security device includes a private key that defines the at least one security character, and
wherein the security device is configured to:
identify a public key based on the at least one security character, or identify a public key that corresponds to the at least one security character, and
select the one or more rules as rules that correspond to the identified public key.

13. The system of claim 1, wherein the security server is enables the application server to receive the string of characters for processing after the user submits the string of characters for transmission to the application server.

14. A security device apparatus for providing security to user-entered inputs, the apparatus comprising:
a port configured to receive a connector of an input device;
a connector configured to connect to a port of a user device; and
a security processor communicatively coupled to the port and the connector, the security processor configured to:
receive a string of characters from the input device that correspond to inputs made by a user on the user device into a web browser or application that is in communication with an application server,
add at least one security character to the string of characters to generate a watermark string where the at least one security character includes an identifier comprised of one or more identifier characters and a delete key input or a backspace key input after each of the one or more identifier characters, and
transmit the watermark string to the user device,
wherein the security processor is configured to format the at least one security character such that only the string of characters are displayed in the web browser or the application at the user device.

15. The apparatus of claim 14, wherein the input device includes a keyboard and the security device apparatus is connected in-line between the input device and the user device.

16. The apparatus of claim 14, further comprising a memory device configured to store at least one watermark rule,
wherein the security processor is configured to add the at least one security character by applying the at least one watermark rule to at least one of:
a first character of the string of characters entered by the user, and
each of the characters of the string of characters entered by the user.

17. The apparatus of claim 14, wherein the at least one security character includes a hidden character or a non-displayable character.

18. The apparatus of claim 14, wherein the at least one security character includes at least one of the identifier or a randomly generated character.

19. The apparatus of claim 18, wherein the security processor is configured to add the identifier to a first set of characters entered by the user and add randomly generated characters to a second set of characters entered by the user.

20. The apparatus of claim 14, wherein the connector is at least one of a connector or a wireless connector and the port of the user device includes respectively at least one of a device port or a wireless port.

* * * * *